US012422078B2

(12) United States Patent
Tremblay et al.

(10) Patent No.: US 12,422,078 B2
(45) Date of Patent: Sep. 23, 2025

(54) SWIVELLING COUPLING WITH EXTERNAL SEALING ELEMENT

(71) Applicant: TAIMI R&D INC., Saint-Prime (CA)

(72) Inventors: Sébastien Tremblay, Saint-Prime (CA); Michel Taillon, Saint-Prime (CA)

(73) Assignee: TAIMI R&D INC., Saint-Prime (CA)

( * ) Notice: Subject to any disclaimer, the term of this patent is extended or adjusted under 35 U.S.C. 154(b) by 486 days.

(21) Appl. No.: 17/737,635

(22) Filed: May 5, 2022

(65) Prior Publication Data

US 2022/0356974 A1 Nov. 10, 2022

Related U.S. Application Data

(60) Provisional application No. 63/201,573, filed on May 5, 2021, provisional application No. 63/201,574, filed on May 5, 2021.

(51) Int. Cl.
| | |
|---|---|
| *F16L 27/08* | (2006.01) |
| *F16L 27/12* | (2006.01) |
| *F16L 37/23* | (2006.01) |
| *F16L 37/24* | (2006.01) |
| *F16L 37/32* | (2006.01) |
| *F16L 37/34* | (2006.01) |
| *F16L 37/40* | (2006.01) |
| *F16L 37/53* | (2006.01) |

(52) U.S. Cl.
CPC ............ *F16L 37/32* (2013.01); *F16L 27/0816* (2013.01); *F16L 37/23* (2013.01); *F16L 37/24* (2013.01); *F16L 37/34* (2013.01); *F16L 37/40* (2013.01); *F16L 37/53* (2013.01); *F16L 27/0812* (2013.01); *F16L 27/1274* (2019.08)

(58) Field of Classification Search
CPC ..... F16L 27/023; F16L 27/08; F16L 27/1274; F16L 27/0812; F16L 27/0816
USPC ......................................... 285/272, 278, 280
See application file for complete search history.

(56) References Cited

U.S. PATENT DOCUMENTS

| | | | | |
|---|---|---|---|---|
| 2,227,105 | A | * | 12/1940 | Pritchard ............ F16L 27/0816 |
| 2,378,329 | A | * | 6/1945 | Rotter ........................... 285/278 |
| 2,648,553 | A | * | 8/1953 | Ulrich ........................... 285/280 |
| 2,956,823 | A | * | 10/1960 | Benjamin, Jr. ...... F16L 27/1274 |
| 3,776,578 | A | * | 12/1973 | Jessup ................. F16L 27/0812 |
| 7,722,089 | B2 | * | 5/2010 | Nauer |
| 7,938,451 | B2 | * | 5/2011 | Taillon ................ F16L 27/0816 |
| | | | | 285/272 |

(Continued)

*Primary Examiner* — William S. Choi
(74) *Attorney, Agent, or Firm* — pH IP Law

(57) ABSTRACT

A coupling for providing a connection and establishing fluid communication between fluid lines is provided. The coupling includes a housing defining an internal cavity with an open end, and a male component engageable within the internal cavity through the open end. The male component has a shank portion adapted to engage a fluid line. The coupling also has a nut securable to the housing and adapted to surround a portion of the shank portion and radially and axially restrain the shank portion within the internal cavity. The nut is further adapted to allow the male component to rotate with respect to the housing and the nut about a longitudinal axis of the shank portion. The coupling further includes a sealing ring provided about the shank portion which is adapted to at least partially block axial and radial movement of the male component relative to the nut and the housing.

17 Claims, 25 Drawing Sheets

(56) References Cited

U.S. PATENT DOCUMENTS

| | | |
|---|---|---|
| 8,047,579 B2 | 11/2011 | Taillon |
| 2012/0139233 A1* | 6/2012 | Bohner .................. 285/272 |
| 2014/0346770 A1* | 11/2014 | Seghi ..................... 285/278 |
| 2018/0094752 A1* | 4/2018 | Caroll ............. F16L 27/1274 |

* cited by examiner

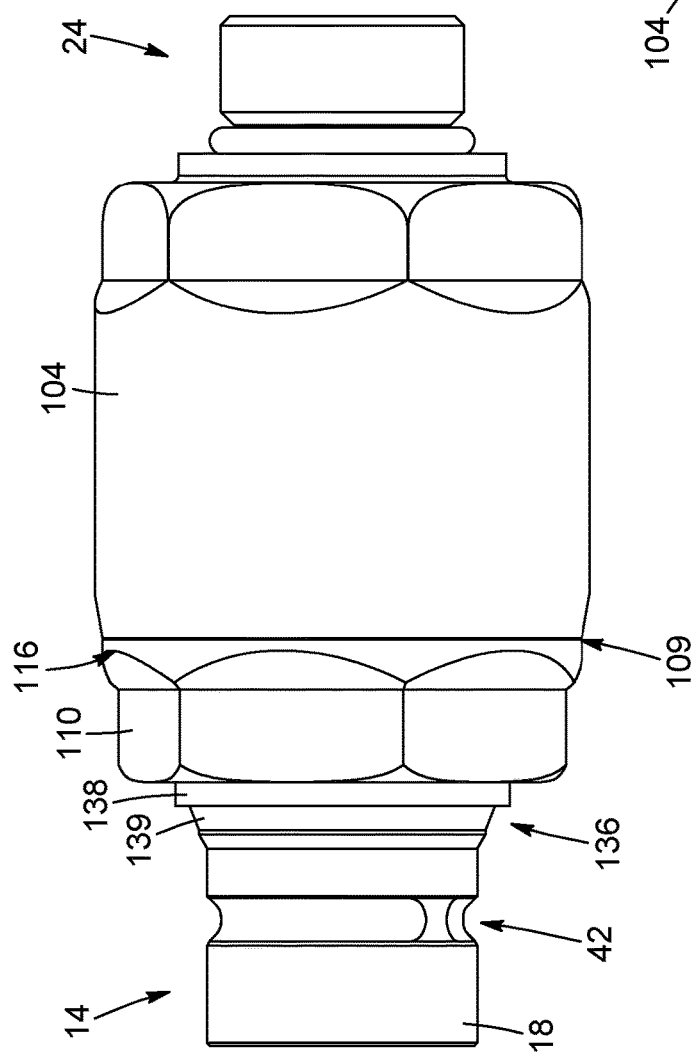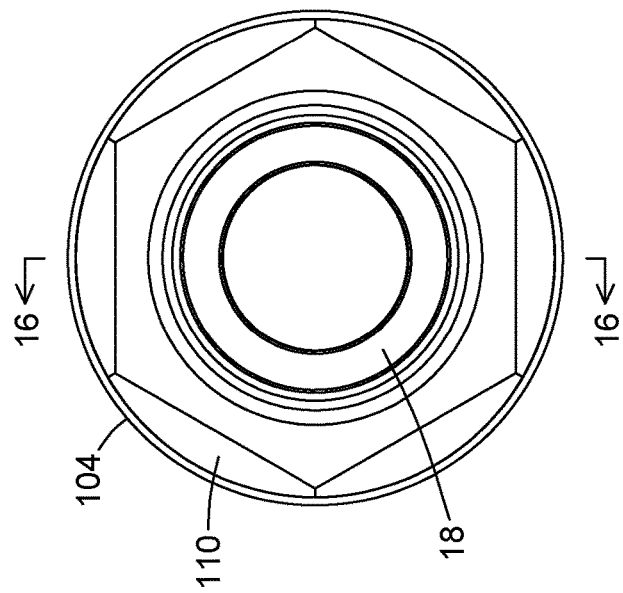

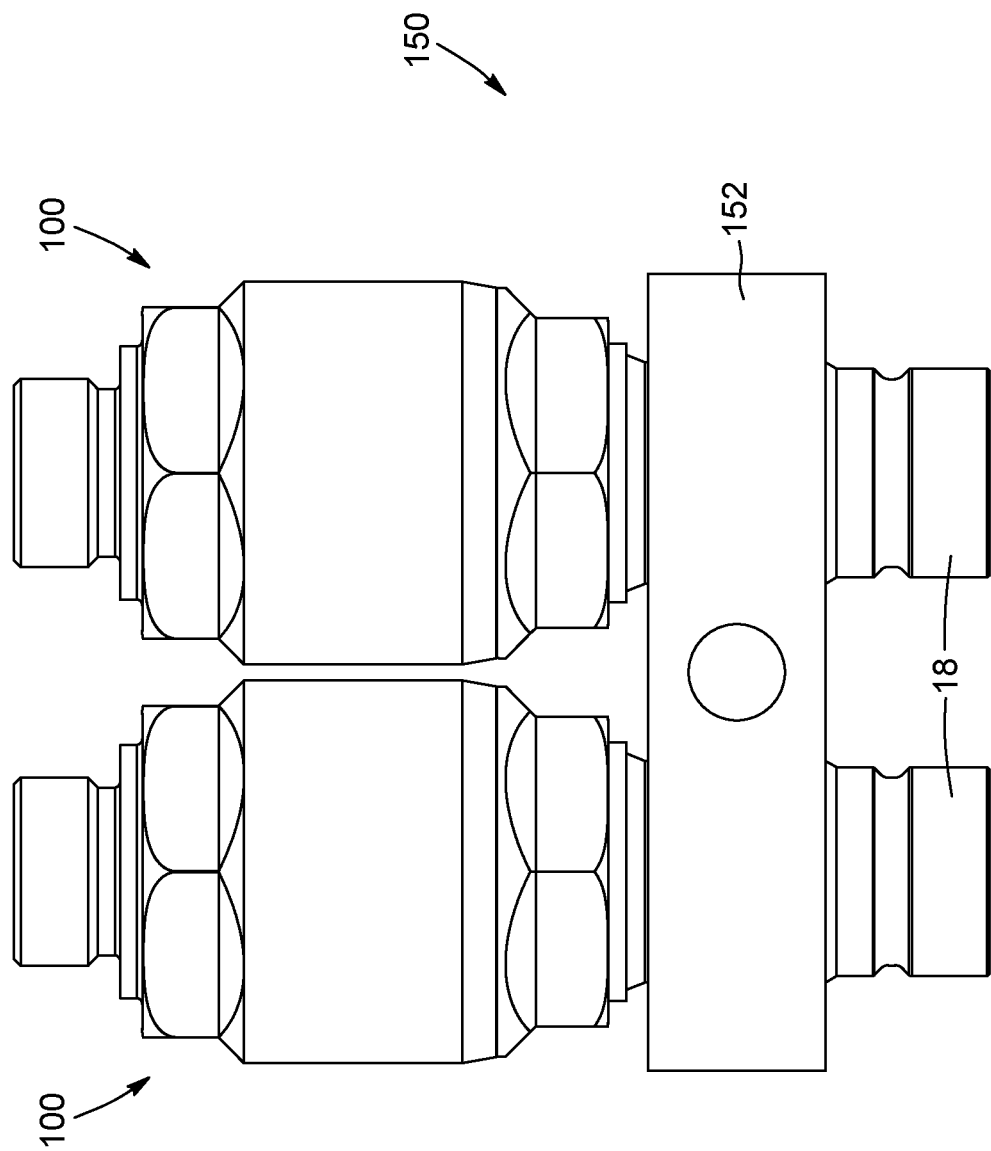

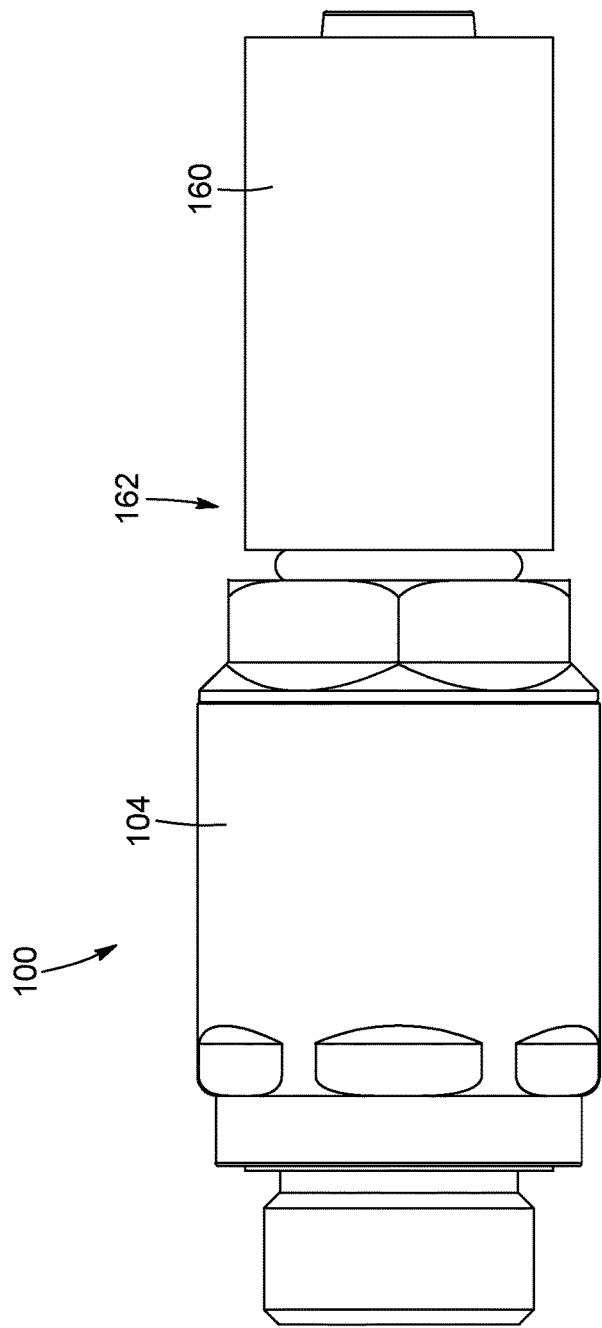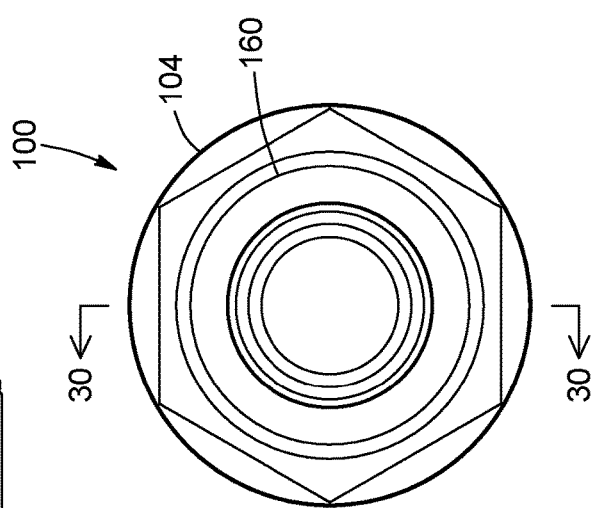

SWIVELLING COUPLING WITH EXTERNAL SEALING ELEMENT

CROSS-REFERENCE TO RELATED APPLICATIONS

This application claims priority under 35USC§ 119(e) of U.S. Provisional Application No. 63/201,573, filed May 5, 2021, entitled "SWIVELLING COUPLING WITH EXTERNAL SEALING ELEMENT", and of US Provisional Application No. 63/201,574, filed on May 5, 2021, entitled "QUICK LOCK RELEASE COUPLING", the entirety of which are hereby incorporated by reference.

TECHNICAL FIELD

The present disclosure generally relates to couplings, and more particularly, to swivelling couplings having external seals for use with hydraulic lines.

BACKGROUND

Several types of couplings are used in the fluid transfer industry. For example, push-to-connect connections, or "quick-release couplings", are different even though the applications and some of the structure are similar to other known couplings. Widely used in the pneumatic industry and for low-pressure applications, quick-release couplings are not designed for higher-pressure applications, such as for the transfer of fluids on heavy machinery where pressurized fluid are flowing and where torsion constraints are present. Hydraulic lines, for instance, being for the most part constructed with braded or intertwined metallic wires or synthetic plastic material, are quite sensitive to torsion constraints.

Swivelling couplings are components that enable two or more hydraulic lines to be interconnected axially or angularly, and to reduce torsion constraints that could affect their physical integrity or internal structure. Quick-release couplings often consist of a male connector with a groove around its periphery allowing the ball bearings of the female connector to be trapped in said groove. Thus, the axial movement is eliminated, while the assembly is free to rotate. Therefore, it becomes similar in every way to a rotary joint consisting of one or more rows of balls and a seal. Pressurized hydraulic fluid, along with the rotation of known rotary joints and swivelling couplings, accelerates wear and tear of the various seals within the coupling, which requires frequent maintenance, repair and replacement.

SUMMARY

According to a first aspect, there is provided a hydraulic coupling for providing a connection between a pair of hydraulic lines. The hydraulic coupling includes a coupling adapter having a fluid channel therethrough and comprising a housing defining an internal cavity having internal surfaces comprising at least one radial surface and at least one axial surface, the internal cavity having an open end. The coupling adapter also includes an adapter port adapted to engage one of the pair of hydraulic lines and establish fluid communication between the hydraulic line and the fluid channel. The hydraulic coupling further has a male component having a fluid passage therethrough and comprising a shank portion having a shank portion port adapted to engage the other one of the pair of hydraulic lines and establish fluid communication between the other hydraulic line and the fluid passage; a flange portion extending radially outward from the shank portion, the male component being insertable within the internal cavity of the housing to enable the flange portion to cooperatively abut on the at least one radial surface, and to enable the fluid passage and the fluid channel to be in fluid communication. The hydraulic coupling further includes a nut securable within the internal cavity of the housing and surrounding the shank portion to radially restrain the shank portion within the internal cavity, the nut having a projection extending axially and into the internal cavity for axially restraining the flange portion within the internal cavity, the nut also allowing the male component to rotate with respect to the housing and the nut about a longitudinal axis of the shank portion, thereby enabling the pair of hydraulic lines to be swivellably interconnected. The hydraulic coupling also includes a sealing assembly comprising an outer seal provided about the shank portion adapted to engage a junction between the nut and the shank portion to substantially seal interstices therebetween, the outer seal being made of resilient material and adapted to block axial and radial movement of the male component relative to the housing.

According to a possible embodiment, the flange portion is coupled to the housing within the internal cavity in a manner defining an axial play with the at least one radial surface.

According to a possible embodiment, the shank portion comprises an outer groove extending circumferentially around an outer surface of the shank portion, and wherein the outer seal is adapted to have a portion thereof extend within the outer groove.

According to a possible embodiment, the outer groove comprises a groove wall extending relatively perpendicularly relative to the longitudinal axis of the shank portion, and wherein the outer seal is adapted to be squeezed between the projection of the nut and the groove wall.

According to a possible embodiment, the outer seal comprises a wiper ring seal having a ring portion adapted to engage the junction of the nut and the shank portion, and a protruding portion extending from the ring portion and adapted to engage the outer groove.

According to a possible embodiment, the protruding portion is adapted to abut against the groove wall and is adapted to block axial movement of the male component relative to the nut.

According to a possible embodiment, wiper ring seal is made of a flexible and resilient material, and is adapted to deform under pressure, and wherein the wiper ring seal is adapted to revert to an initial shape upon relief of the pressure.

According to a possible embodiment, the protruding portion extends at a downward angle from the ring portion.

According to a possible embodiment, the protruding portion has a protruding portion thickness, and the ring portion has a ring portion thickness, and wherein the ring portion thickness is greater than the protruding ring portion thickness.

According to a possible embodiment, the ring portion thickness is between about 1.2 and 4 times greater than the protruding portion thickness.

According to a possible embodiment, the projection of the nut comprises a tapered inner edge such that a thickness of the projection of the nut decreases toward the open end, and wherein the outer seal is adapted to be squeezed between the tapered inner edge and the groove wall.

According to a possible embodiment, the outer seal comprises a first outer seal provided within the outer groove and extending between the nut and the shank portion to block radial movement of the shank portion, and further comprises a second outer seal provided within the outer groove and extending between the tapered inner edge and the groove wall to at least partially block radial and axial movement of the shank portion.

According to a possible embodiment, the tapered inner edge defines an angle of about 5 to about 85 degrees relative to the longitudinal axis of the shank portion.

According to a possible embodiment, the hydraulic coupling further includes a slide-ring provided about the shank portion between the flange portion and the projection of the nut, the slide-ring being adapted to reduce wear of the flange portion and the nut.

According to a possible embodiment, the slide-ring is in sealing engagement with the projection on a first side thereof, and with the flange portion of a second side thereof.

According to a possible embodiment, the outer seal is configured to maintain the slide-ring in sealing engagement with the projection and the flange portion by blocking axial movement thereof.

According to a possible embodiment, the sealing assembly further comprises inner seals provided between and abuttable against the nut and the shank portion, the inner seals being adapted to seal interstices between the male component and the internal surfaces of the cavity and between the male component and the nut.

According to a possible embodiment, the hydraulic coupling is a quick-release hydraulic coupling.

According to a possible embodiment, the open end of the internal cavity has a perimeter rim and the nut comprises a lip abuttable over said perimeter rim.

According to a possible embodiment, the shank portion is extendable through the nut so that the shank portion port is located beyond the nut.

According to a possible embodiment, the shank portion is removably connected to the flange portion.

According to a possible embodiment, the hydraulic coupling further includes a valve assembly operable to control fluid flow along the fluid passage of the male component before, during and after engaging the shank portion with the corresponding hydraulic line.

According to a possible embodiment, the valve assembly comprises a valve head provided within the fluid passage proximate the shank portion port and being operable in a closed position where fluid flow is blocked through the shank portion port, and an open position, the valve assembly further comprising a head spring connected to the valve head and being adapted to bias the valve head in the closed position.

According to a possible embodiment, the valve assembly comprises a valve body provided within the fluid passage and spaced from the shank portion port, the valve body being operable in a closed position where fluid flow through the fluid passage is blocked, and an open position where fluid flow through the fluid passage is allowed, the valve assembly further comprising a body spring connected to the valve body and being adapted to bias the valve body in the closed position.

According to another aspect, a coupling for providing a connection and establishing fluid communication between fluid lines is provided. The coupling includes a housing defining an internal cavity having an open end, the housing being connectable to a first fluid line; a male component adapted to engage the internal cavity through the open end and comprising a shank portion having a shank portion port adapted to engage a second fluid line; a nut securable to the housing and being adapted to surround a portion of the shank portion to radially and axially restrain the shank portion within the internal cavity, the nut being further adapted to allow the male component to rotate with respect to the housing and the nut about a longitudinal axis of the shank portion; and a sealing ring provided about the shank portion and being shaped and adapted to at least partially block axial and radial movement of the male component relative to at least one of the nut and the housing.

According to another aspect, a use of a coupling for providing a connection and establishing fluid communication between a first fluid line and a second fluid line is provided. The coupling includes a housing defining an internal cavity having an open end; a male component adapted to engage the internal cavity through the open end and comprising a shank portion having a shank portion port adapted to engage the first fluid line; a nut securable to the housing and being adapted to surround a portion of the shank portion to radially and axially restrain the shank portion within the internal cavity, the nut being further adapted to allow the male component to rotate with respect to the housing and the nut about a longitudinal axis of the shank portion; and a sealing ring provided about the shank portion and being shaped and adapted to at least partially block axial and radial movement of the male component relative to at least one of the nut and the housing.

According to a possible embodiment, the coupling is adapted to operate between about 0 psi and 5000 psi.

According to another aspect, a method of connecting a first fluid line to a second fluid line using a coupling as defined above is provided. The method includes the steps connecting the coupling adapter to the second fluid line; and engaging the shank portion with the first fluid line.

According to another aspect, a method of connecting a first fluid line provided with a female component to a second fluid line is provided. The method includes connecting a first end of a hydraulic coupling to the second fluid line; and connecting a second end of the hydraulic coupling to the first fluid line, the second end being provided with a male component configured to engage the female component, the hydraulic coupling being provided with a sealing ring provided about the male component and being shaped and adapted to at least partially block axial and radial movement of the male component relative to a housing of the coupling.

According to a possible embodiment, the hydraulic coupling is a quick release coupling.

BRIEF DESCRIPTION OF THE DRAWINGS

FIG. 14 is a side view of the swivelling coupling shown in FIG. 13, showing the male component coupled within the coupling adapter via a nut, according to an embodiment.

FIG. 15 is a front view of the swivelling coupling shown in FIG. 13, showing a valve head provided within the port of the male component, according to an embodiment.

FIG. 26 is a top view of a pair of swivelling couplings coupled to a multiport swivel assembly, according to an embodiment.

FIG. 28 is a side view of the coupling shown in FIG. 27, showing the coupling adapted and the crimp fitting extending at opposite ends of the coupling, according to an embodiment.

FIG. 29 is a front view of the coupling shown in FIG. 27, according to an embodiment.

DETAILED DESCRIPTION

Figure 1:
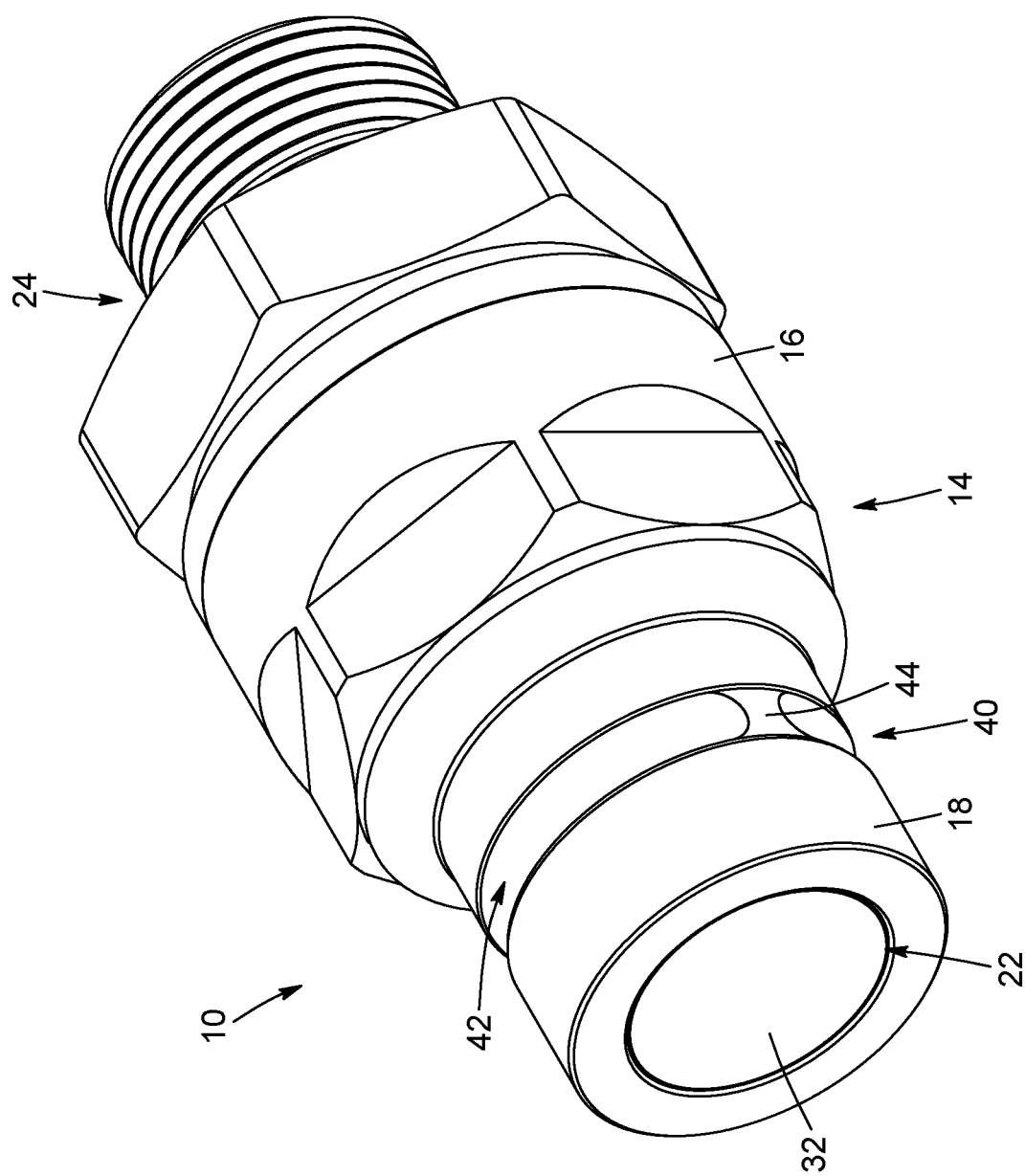
FIG. 1 is a perspective view of a quick lock release coupling provided with a restraining mechanism for preventing movement of a portion of the quick lock release coupling, according to a possible embodiment.
Figure 3:
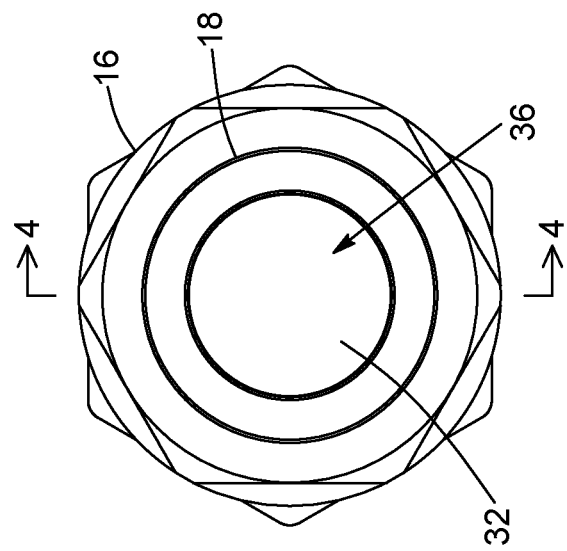
FIG. 3 is a front view of the quick lock release coupling shown in FIG. 1, showing a valve head provided within a port of the coupling, according to an embodiment.

As will be explained below in relation to various implementations, the present disclosure describes devices and systems for providing improved connections for hydraulic machinery, such as quick lock release couplings configured to be coupled to and between hydraulic lines. The present disclosure describes a quick lock release coupling that is easily and reliably connectable to hydraulic lines adapted for the transport of hydraulic fluid at elevated pressures. The quick lock release coupling can include a male component shaped and sized to engage a female component of a hydraulic line. The male component includes a restraining mechanism adapted to block movement of the male component relative to the hydraulic line (e.g., relative to the female component) when coupled thereto. The female component traditionally includes a ball bearing assembly adapted to prevent axial movement of the male component while enabling rotation of the male component when coupled thereto. The restraining mechanism described herein can be further adapted to block a rotational movement of the male component. For example, the restraining mechanism can include a detent shaped and sized to extend between a pair of adjacent balls of the ball bearing assembly, thereby preventing rotation of the male component.

It is thus noted that the male component is adapted to remain generally static relative to the hydraulic line due to the restraining mechanism. Moreover, it is appreciated that blocking movement of the male component relative to the hydraulic line can improve the lifespan and efficiency of the various sealing components of the quick lock release coupling, which sustain less stress, less friction, less compression forces, etc., due to the static assembly of the male component.

The quick lock release couplings can be configured to enable the transport of hydraulic fluid for various operations. The couplings can be implemented on various apparatuses, machines and devices, such as forestry combo harvesters, industrial reach mowers, compact tracked loader attachments, agriculture attachments, among others. As will be described herein, the hydraulic coupling can be adapted to provide interconnection between two fluid lines. The coupling can enable a coaxial interconnection of two fluid lines, but it should be understood that the coupling may be adapted to provide a different interconnection, such as a 90° connection or an oblique connection. Alternatively, or additionally, the quick lock release coupling can include an integrated swivel assembly adapted to enable motion of the one or more hydraulic lines connected to the quick lock release coupling and provide long-lasting sealing capabilities before servicing.

With reference to FIGS. 1 to 4, an example quick release coupling 10 (or simply "coupling") for interconnecting and establishing fluid communication between a pair of fluid lines is illustrated. The coupling 10 includes one or more components connected to one another and defining a central passage 12 through the coupling 10. Therefore, fluid, such as hydraulic fluid, can flow through the coupling 10 via the central passage 12. In some embodiments, the coupling 10 includes a first component configured to engage a first fluid line, and a second component configured to engage a second fluid line, thereby connecting the fluid lines to one another. The first and second components are secured to one another and each define a portion of the central passage 12. In this embodiment, the central passage 12 is generally longitudinal, with the inlet of the first component being substantially aligned with the inlet of the second component. However, it is appreciated that other configurations are possible, such as having a curved or bent central passage 12.

Figure 4:
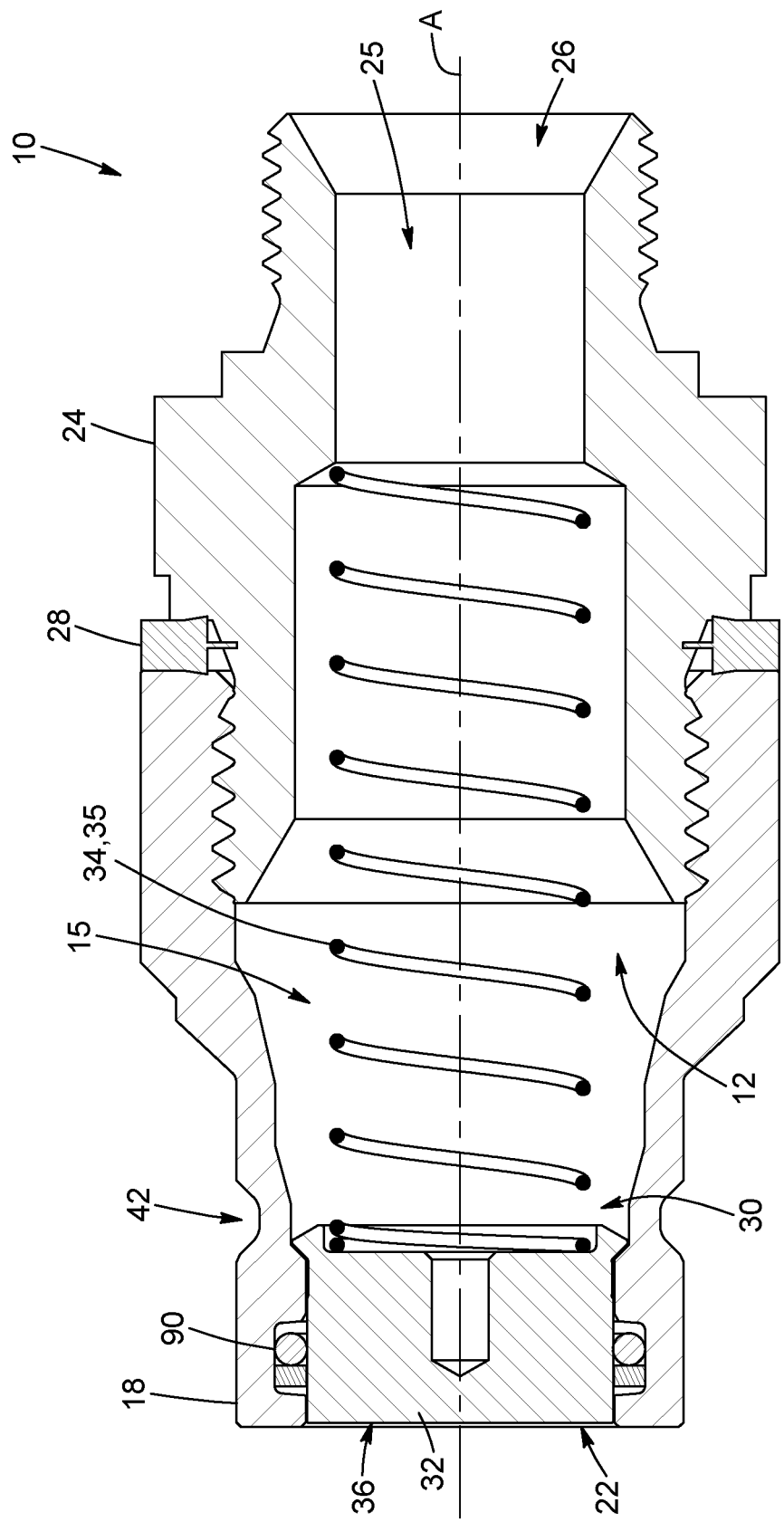
FIG. 4 is a sectional view of the quick lock release coupling shown in FIG. 3, taken along line 4-4, showing a fluid passage extending through a housing of the quick lock release coupling, according to an embodiment.

In this embodiment, the first component of the coupling 10 can include a male component 14 defining a fluid passage 15 therethrough, and having a body portion 16 and a shank portion 18 extending from a first side of the body portion 16. As seen in FIG. 4, the male component 14 has internal surfaces 20 extending along the body and shank portions 16, 18 which define the fluid passage 15. Furthermore, and as will be described further below, the shank portion 18 is adapted to engage the first fluid line and includes a first port, or male component port 22, configured to establish fluid communication between the first fluid line and the fluid passage 15.

Figure 2:
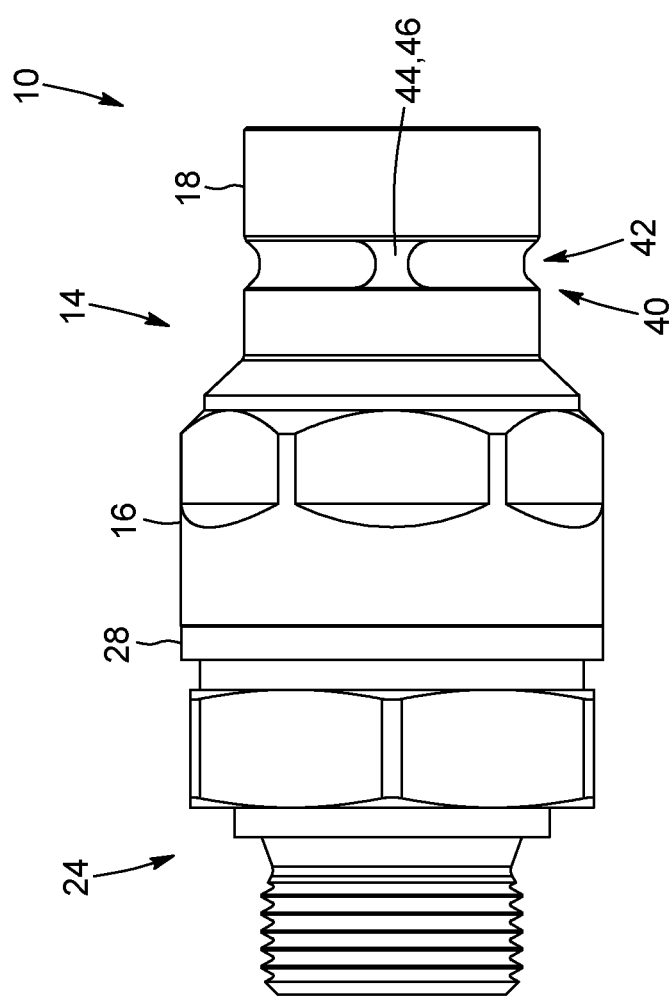
FIG. 2 is a side view of the quick lock release coupling shown in FIG. 1, showing a male component and a coupling adapter extending at opposite ends of the quick lock release coupling, according to an embodiment.

In this embodiment, the second component of the coupling 10 includes a coupling adapter 24 defining a fluid channel 25 therethrough. The coupling adapter 24 is securable to the male component 14 in a manner such that the fluid channel 25 communicates with the fluid passage 15. It is noted that, in this embodiment, the combination of the fluid passage 15 and the fluid channel 25 forms the central passage 12 of the coupling 10, although other configurations are possible. In this embodiment, the coupling adapter 24 is adapted to be secured to the body portion 16 of the male component 14, opposite the shank portion 18. For example, the body portion 18 and the coupling adapter 24 can have complementarily shaped threads, enabling the coupling adapter 24 to be threaded into the body portion 18. In some embodiments, the coupling 10 includes an adapter seal 28 provided between the coupling adapter 24 and male component 14 to further secure the components together and prevent fluid from leaking therebetween. As seen in FIGS. 2 and 4, the coupling adapter 24 is provided with an adapter port 26 adapted to engage the second fluid line and establish fluid communication between the second fluid line and the fluid channel 25. It is thus noted that the first fluid line and the second fluid line are fluidly connected via the coupling 10, where fluid flows through the fluid channel 25 and fluid passage 15, in either direction.

Still referring to FIGS. 1 to 4, the coupling 10 can be provided with a valve assembly 30 configured to control the flow of fluid through the coupling 10 (e.g., through the male component 14, through the coupling adapter 24 or a combination thereof). The valve assembly 30 can be operable between a closed configuration, where fluid flow through the first port 22 is blocked, and an open configuration, wherein fluid flow through the first port 22 is allowed. In this embodiment, the valve assembly 30 includes a valve head 32 provided along the fluid passage 15, and more specifically within the first port 22. The valve head 32 is adapted to move between a closed position (seen in FIG. 4) where the valve head 32 obstructs the first port 22, and an open position, where the valve head 32 is displaced such that the first port 22 becomes unobstructed.

In this embodiment, the valve assembly 30 includes a resilient element 34 coupled to the valve head 32 and configured to bias the valve head 32 in the closed position. For example, the resilient element 34 can include a spring 35 operatively connected to the valve head 32 to bias the valve head 32 in the closed position. As seen in FIG. 4, the spring 35 can extend along the fluid passage 15 and abut against an internal surface of the coupling adapter 24. It is noted that opening the valve assembly 30 (i.e., moving the valve head 32 in the open position) includes moving the valve head 32 further within the fluid passage 15 (i.e., towards the coupling adapter 24), thereby compressing the spring 35 and opening the first port 22. In some embodiments, the female component can be provided with an actuator, such as a stem, configured to push against the valve head 32 when engaging the shank portion 18 with the first fluid line. In other words, while being pressed against the stem of the female component, the valve head retreats inside the male component, thereby opening the first port 22. The valve head 32 illustratively has a flat outer surface 36 adapted to be generally coplanar with the end of the shank portion 18 when in the closed position.

In some embodiments, the shank portion 18 includes a restraining mechanism 40 adapted to prevent undesired or accidental disengagement of the male component 14 from the first fluid line. For example, the restraining mechanism 40 can be provided along the external surface of the shank portion 18 for engaging an inner surface of the first fluid line. Traditionally, the first fluid line can include a female component (not shown) provided with a ball bearing assembly installed circumferentially along the inner surface. Moreover, and as seen in FIGS. 1, 2 and 4, the restraining mechanism 40 includes a groove 42 extending circumferentially about the shank portion 18, and being shaped and sized to receive the ball bearing assembly therein. As such, once the shank portion 18 engages the first fluid line, the ball bearing assembly and the groove 42 cooperate with one another to block axial movement of the male component 14 relative to the first fluid line, thereby preventing disengagement therefrom.

In some embodiments, the restraining mechanism 40 is further adapted to block a rotational movement of the male component 14 relative to the first fluid line. More particularly, it is noted that the ball bearing assembly can enable rotation of the male component 14 about its longitudinal axis (A). However, the restraining mechanism 40 can include a detent 44 shaped and sized to engage the ball bearing assembly to prevent rotation of the male component 14. The detent 44 can be fixedly connected to the shank portion 18 such that engagement of the detent 44 with the ball bearing assembly prevents rotation of the shank portion 18 (and thus of the male component 14) in either direction about the longitudinal axis. As seen in FIG. 2, the detent 44 can include a protrusion 46 extending from the shank portion 18 and which is shaped and sized to extend between a pair of adjacent ball bearings to block the rotation of the male component relative to the first fluid line.

Figure 5:
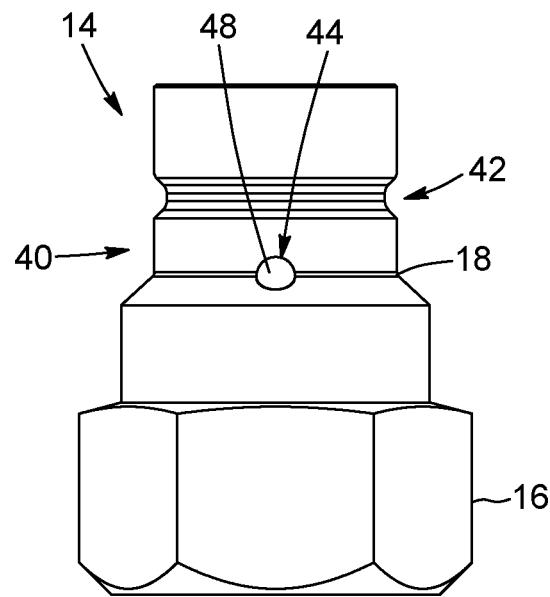
FIGS. 5 to 8 are top views of various embodiments of a male component, showing possible embodiments of the restraining mechanism.

In this embodiment, the protrusion 46 extends from within the groove 42 to facilitate its engagement with the ball bearing assembly (e.g., between a pair of adjacent ball bearings). Furthermore, the protrusion 46 can be integrally formed as part of the shank portion 18 (e.g., during machining of the groove 42), although it is appreciated that other configurations are possible. For example, and with reference to FIGS. 5 to 8, the detent 44 can be provided about the shank portion 18 between the body portion 16 and the groove 42 (see FIGS. 5 and 6), or within the groove 42 (see FIGS. 7 and 8). In the embodiment of FIG. 5, the detent 44 can include a ball 48, or dome-shaped element, connected to and extending from the shank portion 18 to engage the female component of the first fluid line. It should be noted that the female component may require an additional complementarily shaped element configured to engage with the ball 48 to block the rotational movement of the male component. The ball 48 can be spot welded onto the shank portion 18, integrally formed therewith or connected thereto using any suitable method.

Figure 6:
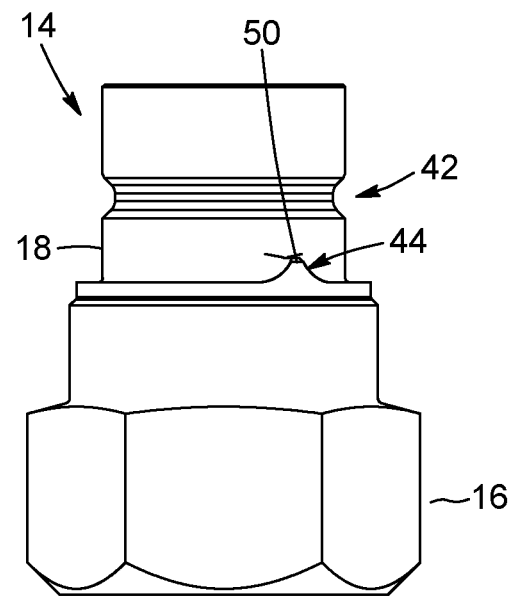

Alternatively, and with reference to FIG. 6, the detent 44 can include a protuberance 50 provided between the body portion 16 and the groove 42 along the external surface of the shank portion 18. In a similar fashion as the ball 48, the protuberance 50 is configured to engage a complementarily-shaped element of the female component for blocking the rotation of the male component. In some embodiments, the complementarily-shaped element includes a recess (not shown) having a shape conforming to the shape of the protuberance 50 such that the male component 14 is adapted to engage the female component in a predetermined orientation. It is appreciated that the male component 14 can include a plurality of detents 44 provided about the shank portion 18, both in and/or proximate the groove 42.

Figure 7:
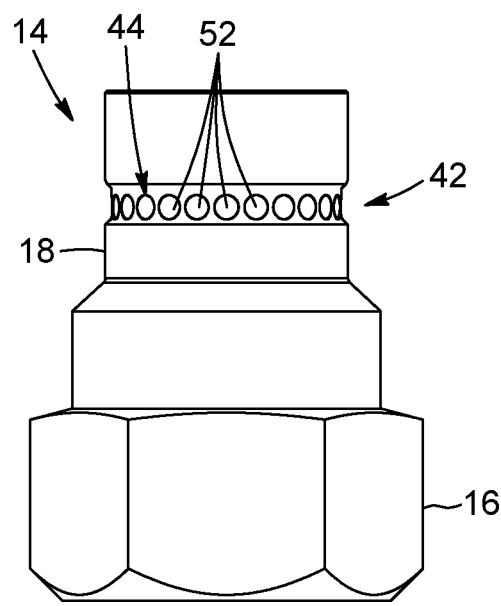

In yet another embodiment, and as seen in FIG. 7, the detent 44 can include one or more recesses 52 provided about the shank portion 18 and/or within the groove 42. The recesses 52 are shaped and sized to receive a ball bearing of the ball bearing assembly such that rotation of the male component 14 about the longitudinal axis is blocked. It is noted that the ball bearing assembly includes a finite number of ball bearings, and that the detent 44 can include any suitable number of recesses 52, such as fewer than the number of ball bearings, more than the number of ball bearings, or the same number. For example, the ball bearing assembly can include twelve (12) ball bearings, and the detent 44 can include twenty-four (24) recesses 52 to facilitate engagement of the ball bearings with the detent.

Figure 8:
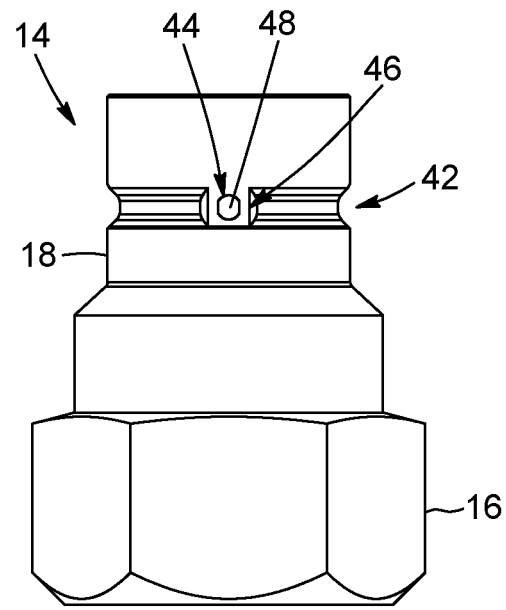
Figure 9:
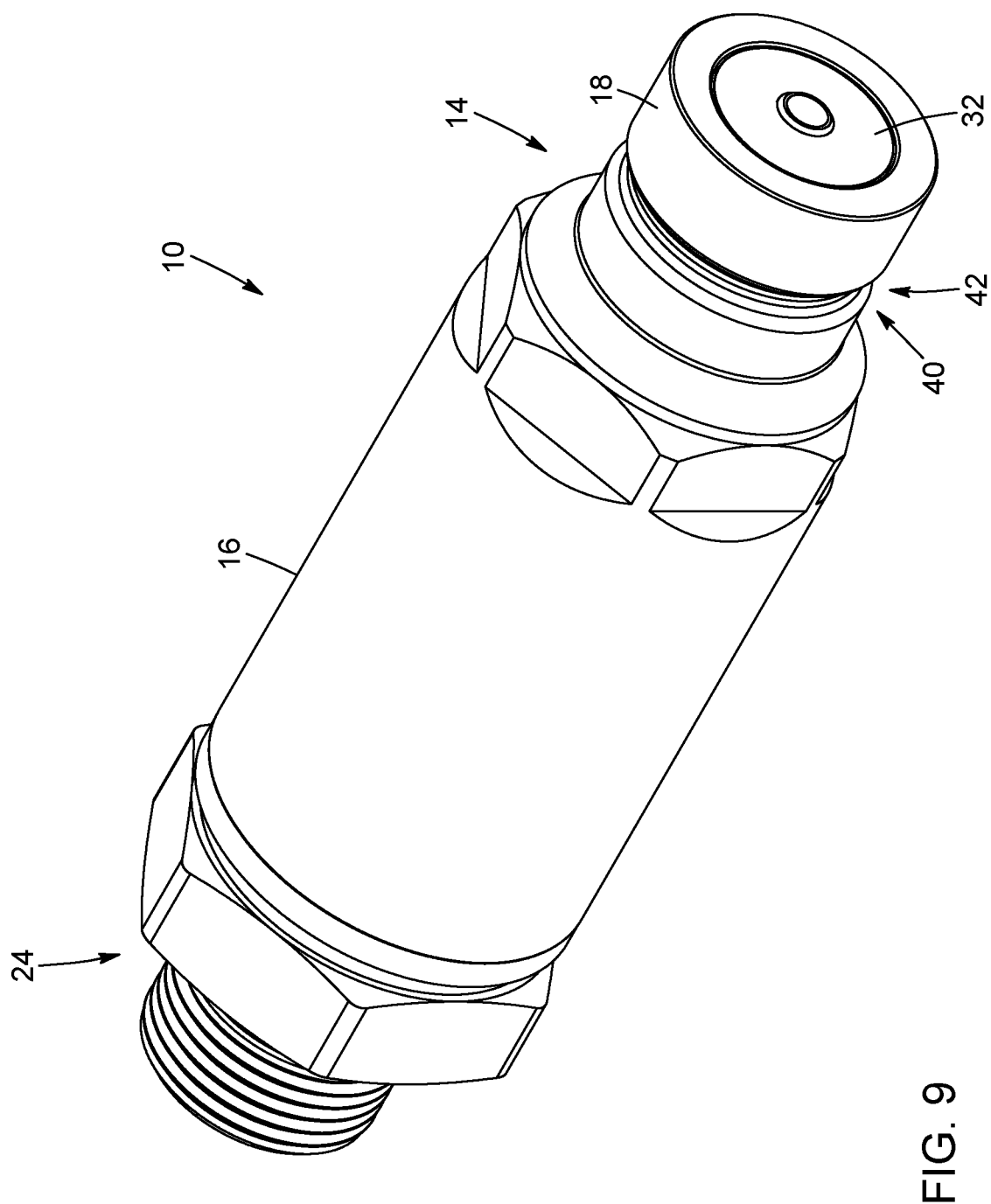
FIG. 9 is a perspective view of a quick lock release coupling, according to an alternate embodiment.
Figure 10:
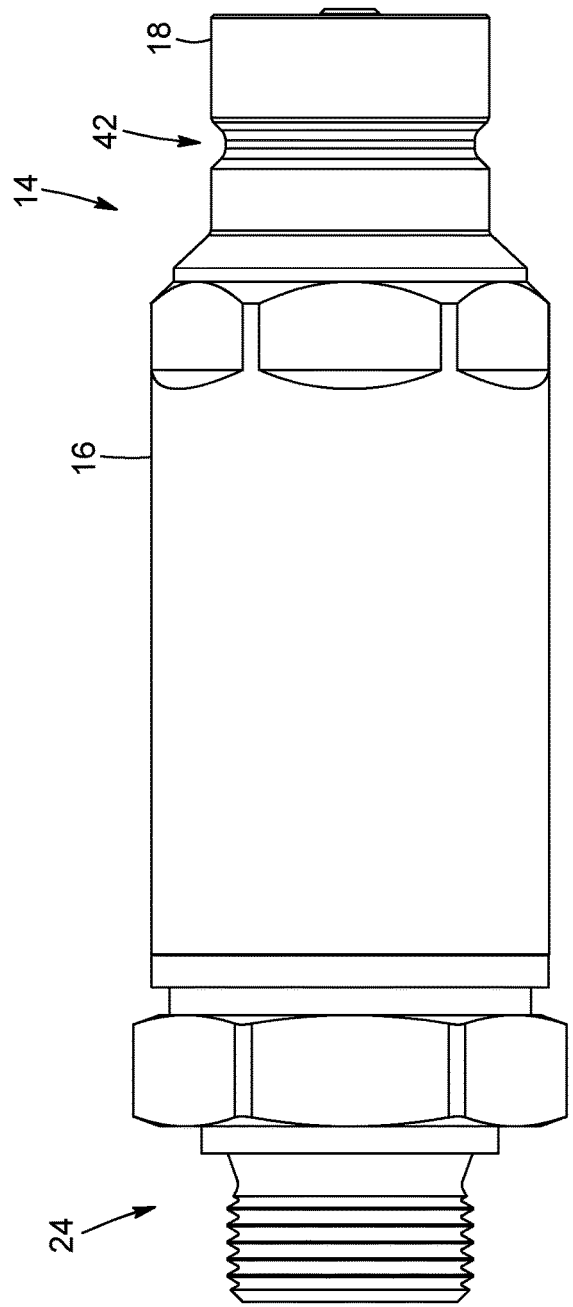
FIG. 10 is a side view of the quick lock release coupling shown in FIG. 9, showing a male component and a coupling adapter extending at opposite ends of the quick lock release coupling, according to an embodiment.
Figure 11:
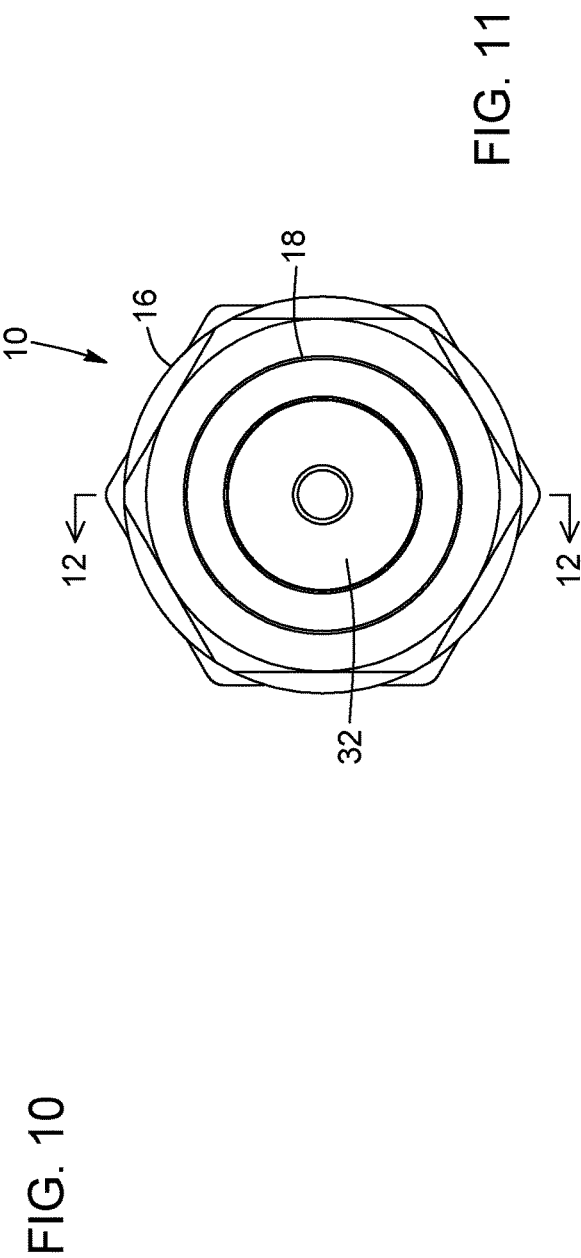
FIG. 11 is a front view of the quick lock release coupling shown in FIG. 9, showing a valve head provided within a port of the coupling, according to an embodiment.

Now referring more specifically to FIG. 8, in this embodiment, the detent 44 includes the protrusion 46 provided along the groove 42, and further includes the ball 48 connected to and extending from the protrusion 46. The protrusion 46 can be adapted to prevent rotation of the male component 14 when engaged with the female component, while the ball 48 can facilitate positioning the male component 14 to have a pair of adjacent ball bearings on either side of the protrusion 46. It should be noted that the detent 44 of the restraining mechanism 40 can include any suitable component, feature or combination thereof to prevent rotation of the male component 14. For example, the detent 44 can includes the recesses 52 provided along the groove 42, in addition to having a protuberance 50 extending from the body portion 18 and between a pair of adjacent ball bearings. It is appreciated that any other combination of the detent 44 can be used and is possible.

Figure 12:
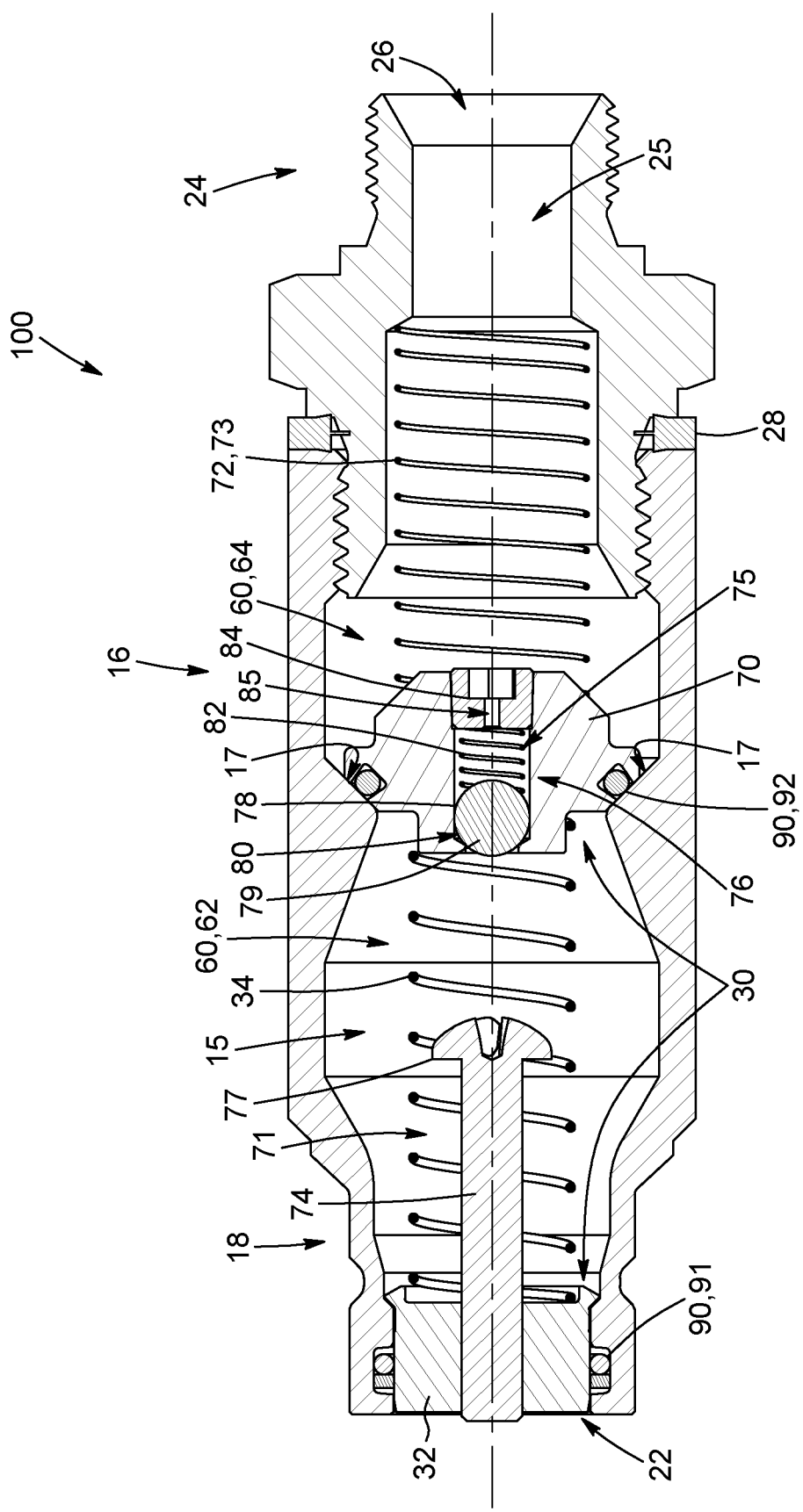
FIG. 12 is a sectional view of the quick lock release coupling shown in FIG. 11, taken along line 12-12, showing a pressure eliminator provided within a valve body, according to an embodiment.

Now referring to FIGS. 9 to 12, another embodiment of the coupling 10 will be described. The shank portion 18, and related components (e.g., the restraining mechanism 40) can be substantially the same as the previously described embodiment, and adapted to engage the first fluid line, and prevent axial and rotational movement of the male component. In this embodiment, the body portion 16 is elongated and includes internal surfaces adapted to define one or more internal cavities 60 along the fluid passage 15. Referring more specifically to FIG. 12, the internal cavities 60 can include a first cavity 62 proximate the shank portion 18, and a second cavity 64 proximate the coupling adapter 24 when the coupling adapter 24 is connected to the male component 14.

In this embodiment, the valve assembly 30 further includes a valve body 70 installed along the fluid passage 15, such as within the second cavity 64, and being adapted to block fluid flow between the first and second cavities 62, 64. The valve body 70 is adapted to move between a closed position where the valve body 70 obstructs the fluid passage 15 between the first and second cavities 62, 64, and an open position, where the valve body 70 is displaced such that fluid flow is enabled. As seen in FIG. 12, the internal surfaces of the body portion 16 can include abutment surfaces 17 shaped and sized to have the valve body 70 abut thereon for blocking fluid flow through the fluid passage 15. The valve assembly 30 can also include a second resilient element 72, such as a second spring 73, configured to bias the valve body 70 in the closed position (e.g., bias the valve body 70 against the abutment surfaces 17).

In addition, the valve assembly 30 can include a valve body actuator 71 configured to displace the valve body 70 from the closed position to the open position, thereby compressing the second spring 73 and enabling fluid flow. In this embodiment, the valve body actuator 71 includes a shaft 74 connected to and extending from the valve head 32 within the fluid passage 15. It is thus noted that engaging the male component with the female component of the first fluid line causes the valve head 32 to retreat within the fluid passage 15, and subsequently causes the shaft 74 to engage and push against the valve body 70 to move it in the open position. Therefore, the shank portion 18 can at least partially engage the female component prior to fluid communication being established between the first and second fluid lines due to the distance between the shaft head 77 and the valve body 70.

In some embodiments, it can be desirable to at least partially control the pressure within the coupling 10, such as within the fluid channel 25 and the fluid passage 15 (e.g., within the first cavity 62 and/or the second cavity 64) to prevent malfunctions or damage caused by pressure differentials or pressurization issues. For example, hydraulic fluid can be provided to the second cavity 64 via the second fluid line, with the valve body 70 blocking fluid flow into the first cavity 62. Therefore, it is noted that the pressure within the second cavity 64 increases, while the pressure within the first cavity 62 remains low (e.g., null), making it difficult to move the valve body 70 in the open position to provide hydraulic fluid to the first fluid line. As such, in some embodiments, the valve body 70 can include a pressure eliminator 76 operable to eliminate, or at least reduce, the pressure within the first and second cavities 62, 64 prior to moving the valve body 70 in the open position.

In this embodiment, and still referring to FIG. 12, the valve body 70 has a bore 75 defined therethrough and communicating with the first cavity 62 at a first end thereof, and with the second cavity 64 at a second end thereof. The pressure eliminator 76 can be coupled to the valve body 70 within the bore 75 and is operable to selectively eliminate the pressure within the second cavity to facilitate opening the valve body 70 (e.g., moving to the open position). More specifically, the pressure eliminator 76 can include an obstructing component, such as a plug 78, provided within the bore 75 and being shaped and configured to block fluid flow therethrough. The plug 78 can be displaced to enable a restricted flow of fluid from the second cavity 64 to the first cavity 62, thereby reducing (e.g., eliminating) the pressure within the second cavity 64, or at least creating a pressure balance between the first and second cavities (e.g., substantially the same pressure in each cavity). Therefore, displacement of the valve body 70 into the second cavity 64 to operate it in the open position is facilitated.

In some embodiments, the bore 75 can include a seat 80 adapted to have the plug 78 sit thereon when obstructing fluid flow through the bore 75. As seen in FIG. 12, in this embodiment, the seat 80 is provided proximate the first end of the bore 75 (i.e., proximate the first cavity 62), and the plug 78 engages the seat 80 to block fluid flow through the bore 75. It is noted that the plug 78 is movable between a seated position, where the plug 78 engages the seat 80 to block fluid flow, and an unseated position, where the plug 78 is displaced and spaced from the seat 80, thereby enabling fluid flow between the first and second cavities 62, 64. In this embodiment, the pressure eliminator 76 further includes a plug biasing element 82 operatively connected to the plug 78 and being configured to bias the plug 78 in the seated position. As will be described further below, the pressure eliminator 76 can be operated to apply a force on the plug 78 in order to displace and unseat it. Once the force is removed, the plug biasing element 82 is configured to revert the plug 78 in the seated position, thereby blocking fluid flow through the bore 75 once more.

In this embodiment, the pressure eliminator 76 further includes a cap 84 shaped and sized to fit within the bore 75 to at least partially restrict fluid flow therethrough. In this embodiment, the cap 84 is connected to the valve body 70 within the bore 75 via interference fit, although other connection methods are possible, such as via fasteners, via a keyjoint connection, via adhesive, etc. The cap 84 is illustratively provided proximate the second end of the bore 75, and is thereby on the side of the second cavity 64. As seen in FIG. 12, the plug biasing element 82 is connected to the cap 84 and extends between the cap 84 and the plug 78. Furthermore, the cap 84 includes a cap passage 85 defined therethrough for enabling fluid flow into the bore 75 from the second cavity 64. Therefore, when fluid is introduced within the second cavity 64 (e.g., via the second fluid line), the fluid can flow into the bore 75 via the cap passage 85, although fluid flow into the first cavity 62 is blocked by the plug 78 when in the seated position.

As previously described, engaging the coupling 10 with the female component of the first fluid line causes the valve head 32 to retreat within the fluid passage 15, and subsequently causes the shaft head 77 to engage and push against the valve body 70. Moreover, when in the seated position, the plug 78 can have a portion thereof extend into the first cavity 62. For example, in the illustrated embodiment of FIG. 12, the plug 78 includes a generally spherical body 79 configured to engage the seat 80 in a manner such that a portion of the spherical body 79 communicates with the first cavity 62. As such, moving the shaft 74 toward the valve body 70 causes the shaft head 77 to engage and push the plug 78 inwardly within the bore 75 (e.g., toward the second cavity 64) prior to engaging the valve body 70. It is thus noted that a restricted flowrate of fluid is enabled between the first and second cavities 62, 64 through the bore 75 due to the unseating of the plug 78 via the shaft head 77. It is further noted that enabling the fluid flow between the cavities 62, 64 causes the pressure within the second cavity 64 to drop, thereby facilitating displacement of the valve body 70 into the second cavity 64, and into the open position, therefore establishing a greater flowrate of fluid into the first cavity, and thus between the first and second fluid lines.

It is appreciated that the coupling 10 includes seals 90, or sealing elements, provided between various components for preventing fluid flow through the coupling 10 when fluid flow is undesired (e.g., when the coupling 10 is connected to only one of the first and second fluid lines). For example, the coupling 10 can include a shank portion seal 91 provided proximate the male component port 22 such that the shank portion seal 91 engages the valve head 32 prior to engaging the coupling 10 with the first fluid line, and as seen in FIG. 12. In addition, the coupling 10 can include an internal seal 92 provided about the valve body 70 such that when the valve body 70 is in the closed position, the internal seal 92 engages the abutment surfaces 17 to prevent fluid flow through interstices between the valve body 70 and the body portion 16. It is appreciated that the coupling 10 can include any suitable number of seals provided between any abutting components thereof.

Figure 17:
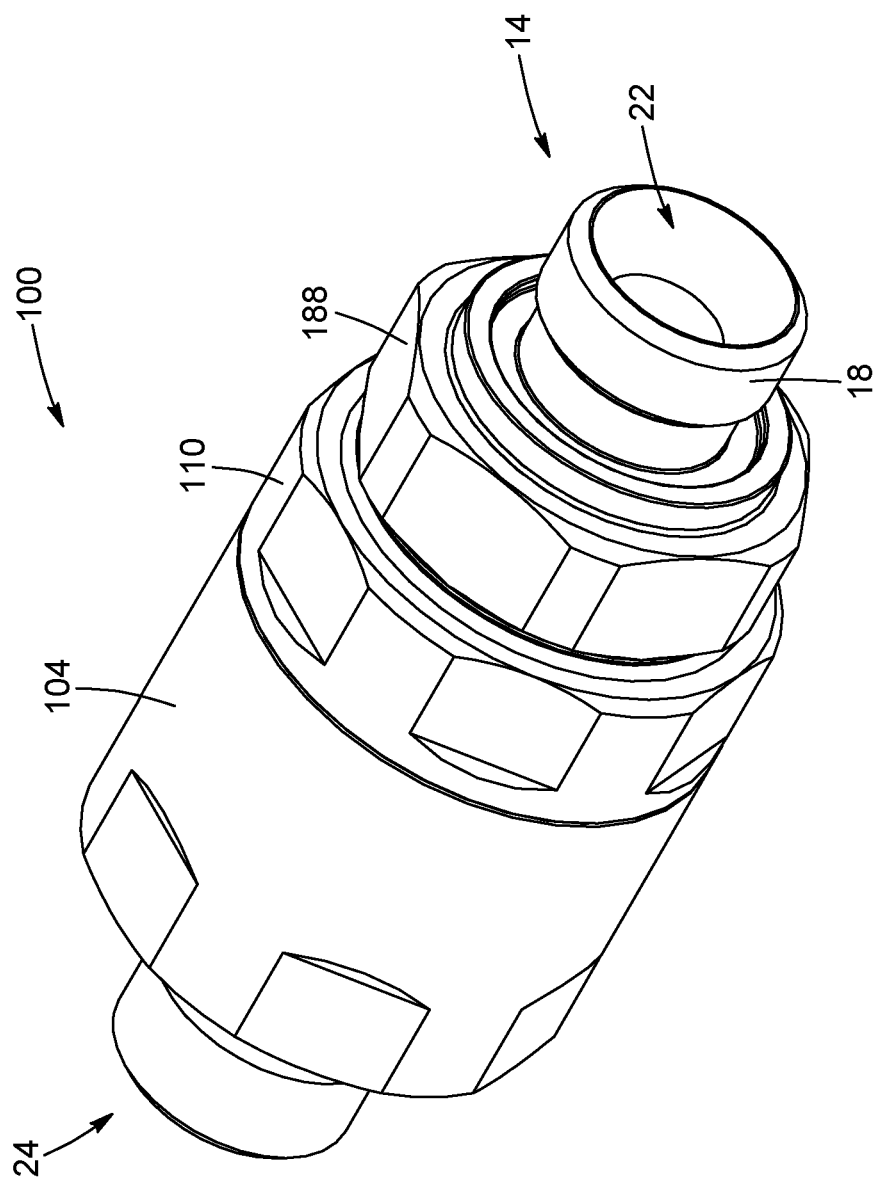
FIG. 17 is a perspective view of a swivelling coupling, according to an alternate embodiment.
Figure 19:
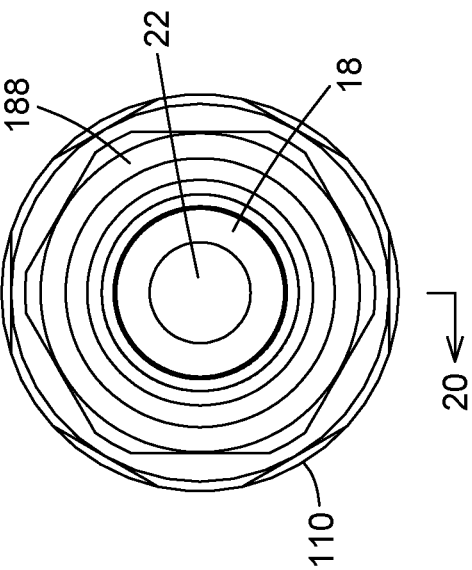
FIG. 19 is a front view of the swivelling coupling shown in FIG. 17, showing a male component port, according to an embodiment.
Figure 18:
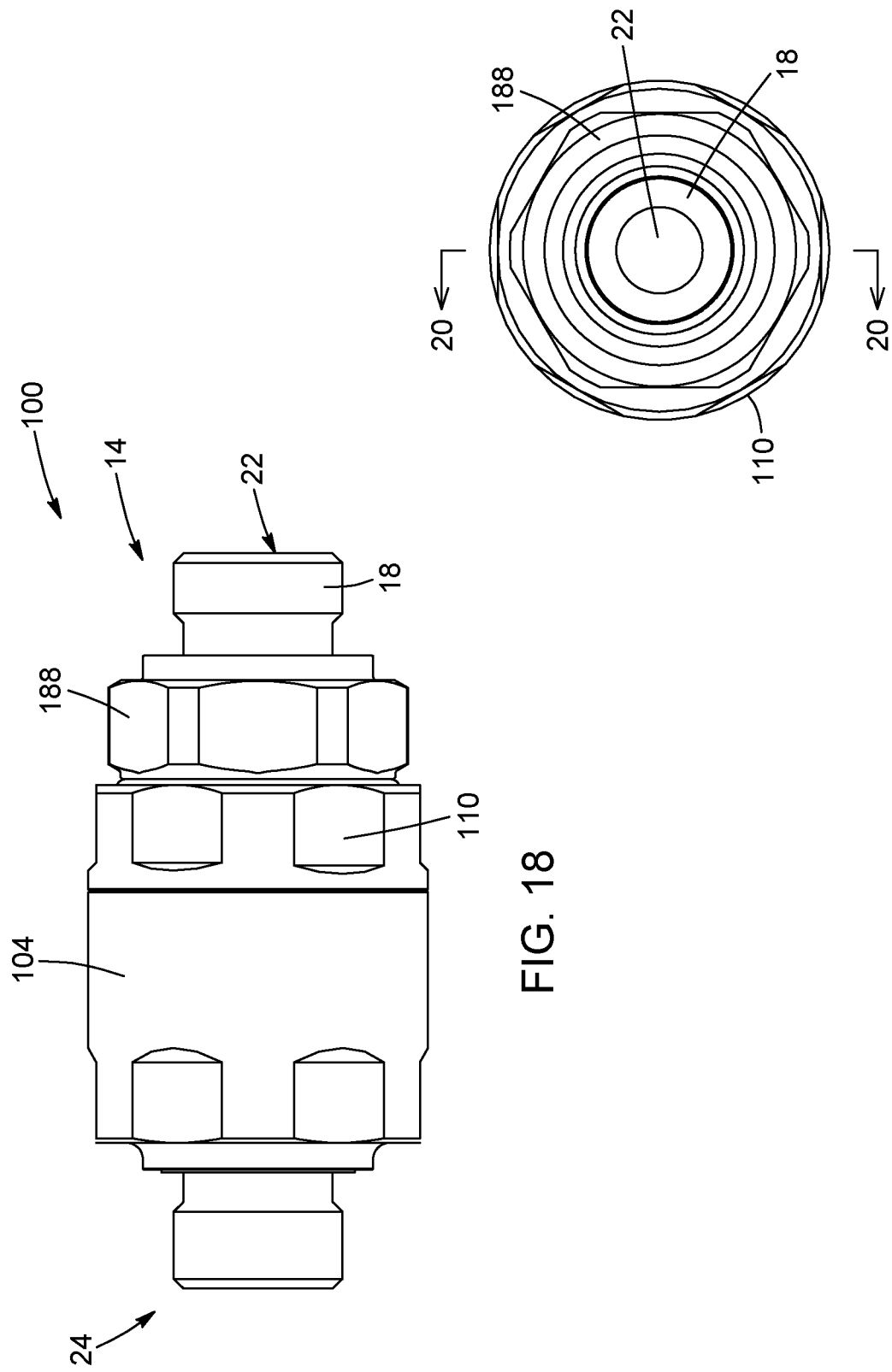
FIG. 18 is a side view of the swivelling coupling shown in FIG. 17, showing the male component coupled within the coupling adapter via a nut, according to an embodiment.

The above-described implementations of the coupling provide for a quick-connect coupling, or a cartridge therefor (seen in FIG. 17), configured to connect to a complementary portion (e.g., male and/or female portion) and define a static connection therebetween. Particularly, the coupling 10 is adapted to block axial movement between the male and female portions, via the engagement of the ball bearings of the female portion with the groove of the male portion, for example. In addition, the restraining mechanism 40 is configured to block a rotational movement of the male and female components relative to one another. As such, it is appreciated that the coupling is adapted to block both axial and rotational movement between the male and female components, thereby defining the static connection therebetween. It should be noted that providing a static connection can increase lifespan of the coupling by reducing the stress, friction among other forces applied to various components of the coupling during operation.

Now referring to FIGS. 13 to 16, another implementation of the coupling is illustrated. In this embodiment, the coupling can be a swivelling coupling 100, where the male component 14 is rotatably coupled to the coupling adapter 24 such that the first fluid line can rotate relative to the second fluid line. In other words, the coupling 100 provides a swivelling connection between the first and second fluid lines. In this embodiment, the male component 14 includes a flange portion 102 extending radially outward from the body portion 16, at an end thereof opposite the shank portion 18. Furthermore, in this embodiment, the coupling adapter 24 includes a housing 104 defining an adapter cavity 105 shaped and adapted to receive the body portion 16 of the male component 14 therein. As will be further described below, the swivelling coupling 100 also includes a nut 110 insertable within the housing 105 for at least partially securing the male component 14 therein.

In some embodiments, the adapter cavity 105 includes internal surfaces including at least one radial surface 106 and at least one axial surface 108. It should be understood that, as used herein, the expression "radial surface(s)" can refer to surfaces extending in generally perpendicular planes relative to the longitudinal axis (A) of the of the coupling 100. Similarly, it should be understood that, as used herein, the expression "axial surface(s)" can refer to surfaces being generally parallel to the longitudinal axis (A), and therefore perpendicular relative to the radial surfaces. The internal surfaces 106, 108 define the adapter cavity 105 which has an open end 107 through which the male component 14 is insertable. However, it is appreciated that other configurations are possible, for example, the housing 104 may include a plurality of cavities in which a corresponding number of male components and nuts may be introduced. The internal surfaces 106, 108 are preferably integrally formed with each other. This usually results from the machining of the housing 104 from a solid piece. In addition, the housing 104 includes an external surface 112 having any suitable finish and/or form. For example, the external surface 112 can have a generally cylindrical or circular shape. In the illustrated embodiment of FIGS. 13 to 16, the external surface 112 is curved and adapted to be retained within a retaining ring (not shown) mounted on the hydraulic machine and enable rotational freedom relative to the retaining ring.

In some embodiments, inserting the body portion 16 within the open end 107 of the adapter cavity 105 includes having the flange portion 102 cooperatively abut on the internal surfaces of the adapter cavity 105. Still referring to FIG. 16, it is appreciated that engaging the male component 14 within the housing 104 can establish fluid communication between the fluid passage 15 of the male component 14 and the fluid channel 25 of the coupling adapter 24. In this embodiment, the fluid passage 15 and fluid channel 25 are substantially collinear, although it is appreciated that other configurations are possible and may be used. For example, the fluid passage 15 and fluid channel 25 may have a variety of orientations, depending on the desired application, such as 90° angles or oblique angles.

In this embodiment, the flange portion 102 is integrally formed with the body portion 16 and extends therefrom in a manner such that the male component 14 has a generally T-shape. The flange portion 102 can be radially continuous and symmetrical, and can be disk-shaped and extend perpendicularly with respect to the body portion 16. As will be described below, this configuration of the male component 14 can provide support surfaces for abutting on the internal surfaces of the housing 104 and the nut 110, thereby distributing the forces (i.e. decreasing the pressure) applied on the components of the coupling 100. However, it is appreciated that the flange portion 102, and/or any other component of the male component 14, can have any suitable shape which cooperates with the internal surfaces of the housing 104. In some embodiments, the flange portion 102 can include scores (not shown) defined on an outer circumferential surface thereof for enabling fluid to flow between the flange portion 102 and the housing 104. This can be useful for lubricating purposes and for defining a self-lubricating coupling, such as the one described in Applicant's U.S. Pat. No. 8,047,579, which is incorporated herein by reference.

Still referring to FIGS. 13 to 16, the nut 110 is securable within the adapter cavity 105 of the housing 104 and surrounding the male component 14 to radially restrain the same within the adapter cavity 105. In some embodiments, the nut 110 can be adapted to surround the male component 14 from the port 22 to the flange portion 102, which allows for improved support, stability and resistance to forces. In this embodiment, the nut 110 is secured about the body portion 16 of the male component 14, with the shank portion 18, and thus the port 22, extending beyond the nut 110 to facilitate connection with the first fluid line. In this embodiment, the nut 110 includes a projection 114 extending axially and internally into the cavity 105 of the housing 104 for axially restraining the flange portion 102, while allowing the male component 14 to rotate with respect to the housing 104 and the nut 110. The rotation of the male component 14 occurs about a longitudinal axis (A) of the shank portion 18.

In some embodiments, the nut 110 can have external threads and the internal surfaces of the housing 104 (i.e., the surfaces of the adapter cavity 105) can have corresponding internal threads to secure the nut 110 within the cavity of the housing. Alternatively, these components may be unthreaded and be bolted, clamped or otherwise connected to one another. As seen in FIGS. 13 to 16, the nut 110 includes a lip 116 extending over a perimeter rim 109 of the open end of the adapter cavity 105 to further secure the nut 110 in engagement with the coupling adapter 24.

In some embodiments, the hydraulic pressure within the adapter cavity 105 pushes the male component 14 axially toward the nut 110. Once pressurized, the pressure inside the housing 104 is substantially uniform in all directions and pushes perpendicularly on the surfaces (e.g., against the flange portion 102, and the radial and axial surfaces 106, 108). In operation, the fluid contained in the fluid passage 15 and/or fluid channel 25 is under hydraulic pressure. Operating pressures vary depending on the application, be it heavy or light. Typical ranges of hydraulic pressure in the forestry industry, for example, are between about 50 and about 4000 psi, and up to around 5000 psi in some cases. In load-sensing hydraulic circuits, the operating pressures most often vary between about 250 psi and 3000 to 4000 psi.

In some embodiments, this pressure results in the direct abutment of the flange portion 102 against the projection 114 of the nut 110. However, in this embodiment, the swivelling coupling 100 further includes a slide-ring 120 surrounding the body portion 16 and disposed between the nut 110 and the flange portion 102. The slide-ring 120 can be adapted to reduce the friction coefficient between the components, e.g., between the flange portion 102 and the nut 110, during rotation of the male component 14. The slide-ring 120 can be particularly desirable in high-pressure hydraulic systems (or alternatively in applications where the fluid is less lubricating) since the axial pressure on the male component 14 greatly increases the friction between the flange portion 102 and the nut 110. In some embodiments, the slide-ring 120 is composed of Nylatron® material group, Nyloil™, Nycast™, Teflon, or another suitable material for such a component. In some embodiments, the slide-ring 120 can include a thrust washer adapted to support the axial load applied thereto, such as the load applied thereto by the flange portion 102 during operation and/or during hydraulic shocks.

Figure 16:
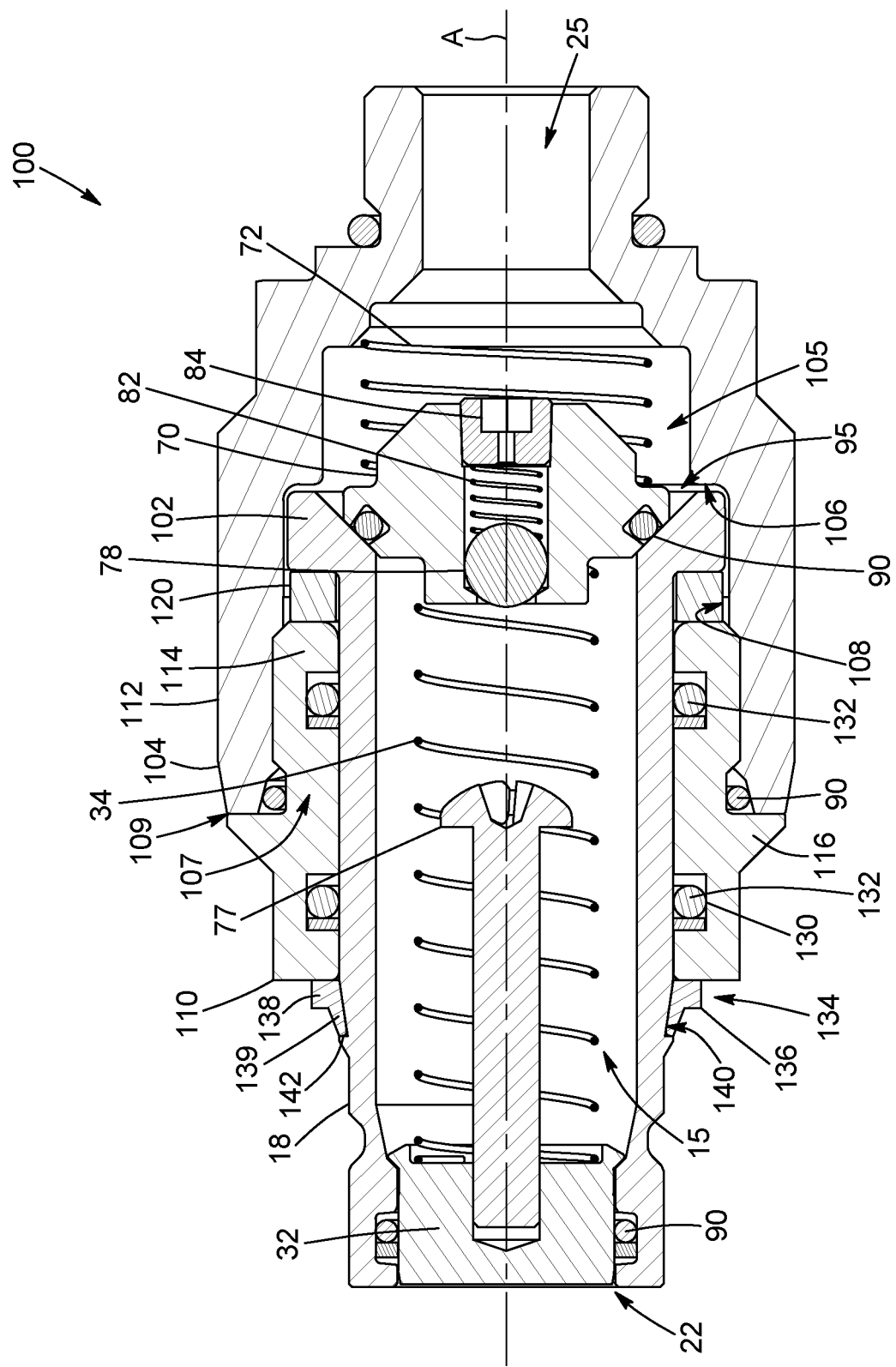
FIG. 16 is a sectional view of the swivelling coupling shown in FIG. 15, taken along line 16-16, showing a flange portion of the male component provided between internal surfaces of the coupling adapter housing and the nut, according to an embodiment.

Referring to FIG. 16, when the male component 14 is coupled within the adapter cavity 105, the flange portion 102 defines an axial play 95 with the radial surface 106 of the adapter cavity 105. More particularly, the internal depth of the adapter cavity 105 is greater than the sum of the width of the flange portion 102 and the length of the projection 114 of the nut 110, thus enabling an amount of axial play 95. In some embodiments, the amount of axial play can be between about 0.005 and about 0.08 inches, although other configurations are possible, such as having a narrower axial play (e.g., <0.005 inches) or wider axial play (e.g., >0.08 inches).

In this embodiment, when under internal fluid pressure, the flange portion 102 is pushed toward the projection 114 of the nut 110, and thus abuts on the slide-ring 120. The slide-ring 120 is adapted to enable a distribution of forces, thereby decreasing the pressure between the components. This in turn enables the swivelling coupling 100 to have improved swivelling performance at higher pressures, such as in the range of 3000 to 5000 psi, for example. In some embodiments, the slide-ring 120 has a flat disk shape, but may also have an O-ring shape to reduce the coefficient of friction. It should be noted that, when the flange portion 102 is pressed against the slide-ring 120, the flange portion 102 is held in spaced relation to the internal axial surface 108 of the adapter cavity 105, and corresponds to the amount of axial play 95. It should be noted that the axial play 95 defined within the adapter cavity 105 may help protect the various components of the coupling 100 from hydraulic shocks (also called "hydraulic rams") or other types of fluid shocks or pressure differentials in and around the coupling.

Figure 33:
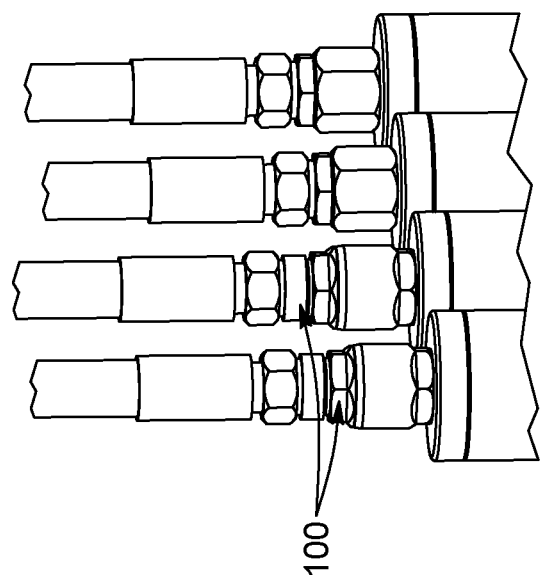
FIG. 33 is an illustration of a hydraulic machine comprising couplings installed in a vertical configuration, according to a possible embodiment.

In some embodiments, it can be desirable to maintain the contact between the flange portion 102, the slide-ring 120 and the nut projection 114 to increase sealing efficiency of the coupling 100 (e.g., prevent exterior fluid(s), dust and/or debris from entering the coupling). During operation, hydraulic fluid flowing through the coupling 100 urges the flange portion 102 against the slide-ring 120, thereby creating the contact between flange portion 102, slide-ring 120 and nut projection 114, and increases sealing efficiency. However, in some embodiments, the contact between these components can be broken, thereby compromising the seal integrity of the coupling. For example, and with reference to FIGS. 31 to 33, underwater applications without any prior pressurization of the coupling (FIGS. 31 and 32), vertical installations of the coupling where the flange portion 102 tends to move away from the slide-ring 120 under gravity (FIG. 33), or under the effect of hydraulic shocks and a vacuum/suction effect occurs within the coupling can decrease the seal integrity of the coupling by applying pressure on inner components of the coupling and breaking the contact between the flange portion 102 and the slide-ring 120, for example. Under such conditions, the risk of infiltration of dust, debris or other contaminants within the coupling is increased and can cause some issues.

Still with reference to FIG. 16, the swivelling coupling 100 can include a seal assembly 130 comprising at least one sealing ring 132 (or O-ring) adapted to cooperate with one or more of the male component 14, the nut 110 and the coupling adapter 24. In this embodiment, once the swivelling coupling 100 is assembled and in operation, the seal assembly 130 is pressed in between the male component 14 and the nut 110 to at least partially cut the pressure of any fluid leaking through the interstices of the coupling 100. The seal assembly 130 can be adapted to prevent fluids from leaking out of the coupling 100. In some embodiments, the seal assembly 130 may include O-rings, back-up rings, etc. Also, the seal assembly 130 may be easily replaced, in the event that it loses its efficiency. Various sealing joints may be used to cut the velocity of the fluid so that if the fluid leaks past one of the seals, it is less likely to leak past the next seal. In other words, a series of seals may be used as part of the seal assembly 130.

In some embodiments, the seal assembly 130 further includes one or more outer seals 134 adapted to prevent fluid from leaking to an exterior of the coupling 100, or to prevent debris and dust from entering the coupling 100. With reference to FIGS. 13 to 16, in this embodiment, the outer seal 134 includes a wiper ring 136 surrounding the male component 14 proximate the shank portion 18. The wiper ring 136 is also adapted to engage the nut 110 in order to create a seal between the nut 110 and the male component 14. In some embodiments, the wiper ring 136 can have a flat-disk shape, although other configurations are possible, as will be described below.

In this embodiment, the male component 14 includes an outer groove 140 extending about the shank portion 18. The outer groove 140 can be shaped and adapted to receive a portion of the wiper ring 136 therein. As seen in FIGS. 14 and 16, the wiper ring 136 can include a ring portion 138 adapted to engage the nut 110, and a protruding portion 139 extending form the ring portion 138 and engaging the outer groove 140. It is noted that both the ring portion 138 and the protruding portion 139 surround the male component 14, i.e., extend circumferentially around the male component. In this embodiment, the outer groove 140 includes a groove wall 142 extending relatively perpendicularly relative to the shank portion 18, and thus substantially parallel to the front surface of the nut 110. The wiper ring 136 is therefore shaped and adapted to extend between the nut 110 and the groove wall 142, with the ring portion 138 engaging the nut 110, and the protruding portion 139 engaging the groove wall 142.

In some embodiments, the wiper ring 136 is made of a resilient material, such as rubber, and is adapted to protect the various components of the coupling during operation of the hydraulic lines (e.g., while fluid is flowing between the first and second fluid lines via the coupling). During operation, it is noted that the various components of the coupling 100 can be submitted to hydraulic shocks (also called "hydraulic rams") which can cause shifts, friction, damage, or failure of these components.

Some hydraulic shocks can result from a suction effect created by the pressure differential between fluid channel 25 and the fluid passage. Specifically, hydraulic fluid can be provided to the fluid channel 25 via the second fluid line, with the valve body 70 blocking fluid flow into the fluid passage 15. Therefore, it is noted that the pressure along the fluid channel 25 and within the adapter cavity 105 increases, while the pressure along the fluid passage 15 remains low (e.g., null). As such, when the valve body 70 is displaced in the open position, the low pressure within the fluid passage can create a vacuum causing the pressure within the adapter cavity 105 to drop substantially rapidly to match the pressure along the fluid passage 15 (e.g., 0psi), thereby creating the suction effect within the coupling 100.

The suction effect (i.e., the hydraulic shock) often creates a force against the flange portion 102 which pushes the flange portion 102 against the nut 110. In this embodiment, the nut 110 then pushes against the wiper ring 136 provided about the male component. The resilient material of the wiper ring 136 is configured to be deformed, thus absorbing at least some of the forces created by the hydraulic shocks and reducing movement of the male component 14, slide-ring 120 and/or nut 110. Once the pressure stabilizes and/or is relieved, i.e., once the forces are no longer applied on the components of the coupling, the wiper ring 136 is adapted to revert back to its initial shape and configuration, thereby also moving the nut 110 and/or male component 14 back in position.

As such, it is appreciated that each time the coupling 100 is connected and/or disconnected from the first fluid line, the pressure within the adapted cavity 105 increases and decreases accordingly, thereby creating repetitive suction effects. The wiper ring 136 is configured to at least partially counteract this suction effect to protect the components of the coupling 100 (e.g., the male component 14) and of the component(s) connected thereto (e.g., the female component), thereby increasing their lifespan and efficiency.

In some embodiments, the wiper ring 136 can have a tapered shape, where the diameter of the wiper ring at a first end thereof is greater than at a second and opposite end thereof. For example, in this embodiment, the protruding portion 139 extends at an angle from the ring portion 138 such that the inner diameter of the wiper ring 136 along the ring portion 138 is greater than the inner diameter of the wiper ring along the protruding portion 139. Moreover, the thickness of the wiper ring 136 along the protruding portion 139 is illustratively less than the thickness thereof along the ring portion 138. This configuration can improve the shockabsorption capabilities of the wiper ring 136 and also improve its resiliency (i.e., its ability to revert back to its initial shape and configuration). During operation, hydraulic pressure within the coupling can cause the wiper ring 136 to be squeezed between the nut 110 and the groove wall 142, thereby causing the protruding portion 139 to at least partially deform (e.g., buckle) to absorb at least some of the forces from the hydraulic rams, for example. The protruding portion 139 is adapted to revert back to its initial configuration once pressure within the coupling has stabilized.

In some embodiments, the ring portion 138 and protruding portion 139 can be made of the same material, and thereby have substantially the same resiliency and/or flexibility. However, it is appreciated that other configurations are possible. For example, the protruding portion 139 can be made of a more resilient or flexible material than the ring portion 139. In such embodiments, it is noted that the ring portion 138 can absorb some of the forces from the hydraulic shocks, although the more resilient protruding portion 139 is configured to absorb more forces.

As seen in FIG. 16, the second spring 72 illustratively extends between an internal surface of the adapter cavity 105 and the flange portion 102, and is adapted to also absorb some of the forces of the hydraulic shocks and bias the flange portion 102 against the slide-ring 120. Therefore, the components of the coupling (e.g., the flange portion 102, the slide-ring 120 and the nut 110) are adapted to remain in contact with one another to ensure sealing efficiency of the coupling. The second spring 72 can be optional, with the axial movement of the components of the coupling being at least partially blocked by the cooperation of the wiper ring 136 with the male component 14 (e.g., with the shank portion) and the nut 110. More specifically, under certain conditions, the flange portion 102 can be made to move into the axial play 95, thereby increasing the risks of impacts with the housing and breaking contact with the slide-ring 120. In this embodiment, when the male component 14 is pushed toward the axial play 95 (e.g., caused by hydraulic shocks, a vertical installation or under external pressure), the groove wall 42 engages the wiper ring 136. The wiper ring 136 can be adapted to absorb some of the forces, and also engages the nut 110, which in turn abuts against the housing 104 via the lip 116. As such, axial movement of the male component 14 toward the axial play 95 is blocked, or at least reduced.

It should be noted that reducing or blocking movement of the components of the coupling (e.g., the flange portion 102, the slide-ring 120 and the nut 110) can reduce the stress, deformation and impacts they sustain during operation. Reducing the forces applied on these components can increase their lifespan, which reduces the need to replace and/or repair them, thereby increasing the efficiency and lifespan of the coupling 100.

Referring broadly to FIGS. 1 to 16, it should be noted that, when the male component 14 of the coupling (10 or 100) engages the female component of the first fluid line, the restraining mechanism 40 is adapted to prevent axial movement of the male component 14 relative to the female component (e.g., via engagement of the ball bearing assembly within the groove 42 provided about the shank portion 18). Furthermore, the restraining mechanism 40 is also adapted to prevent rotational movement of the male component 14 about the longitudinal axis of the shank portion 18 relative to the female component via engagement of the detent 44 with the ball bearing assembly.

In addition, the flange portion 102 is shaped and sized to engage the adapter cavity 105, with the nut 110 blocking axial movement of the male component 14 toward the open end of the adapter cavity 105, and in some embodiments, the wiper ring 136 is adapted to block, or at least impede axial movement of the male component 14 toward the coupling adapter 24 (i.e., into the axial play 95). The axial movement of the male component due to the deformation and wear of the slide-ring 120 (e.g., the thrust washer), along with the suction effect and/or atmospheric pressure (e.g., when submerged in water) is thus also at least partially managed via the wiper ring 136, and the contact between the flange portion 102, slide-ring 120 and nut projection 114 is maintained. It should also be noted that greater forces applied on the wiper ring 136 increase the sealing efficiency of the wiper ring 136 since the wiper ring 136 is squeezed in place between the groove wall 142 and the nut projection 114, thereby further sealing interstices between the nut 110 and the male component 14. This can be desirable in certain situations, such as in vertical installations, or for underwater applications, where the coupling would not be required to be pressurized prior to being submerged since the increasing pressure from the water can increase the sealing efficiency of the wiper ring 136.

Figure 20:
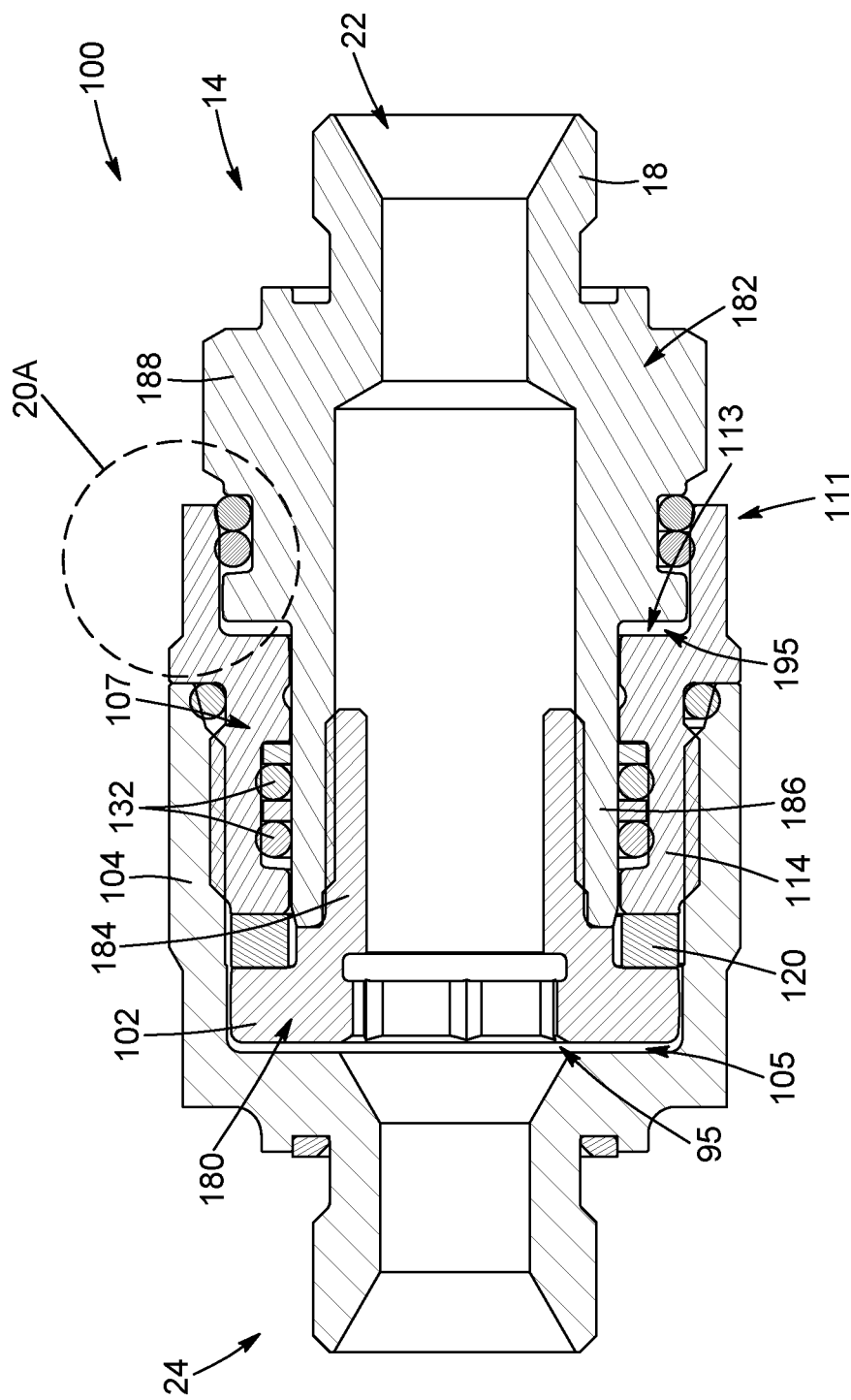
FIG. 20 is a sectional view of the swivelling coupling shown in FIG. 19, taken along line 20-20, showing the shank portion of the male component being coupled to the flange portion provided within the coupling adapter housing, according to an embodiment.

Now referring to FIGS. 17 to 20A, another implementation of the coupling 100 is shown. The male component 14 is provided within the housing 104 of the coupling adapter 24, with the shank portion 18 extending out of the housing 104 for connecting with a female component. The coupling 100 also includes the nut 110 for connecting the male component 14 to the coupling adapter housing 104. Referring more specifically to FIG. 20, the male component 14 can include a plurality of parts coupled to one another. For example, in this embodiment, the male component 14 comprises an inner part 180 which includes the flange portion 102 provided in the adapter cavity 105 proximate the coupling adapter 24, and an inner shaft 184 extending from the flange portion 102 toward the open end 107. Additionally, the male component 14 includes an outer part 182 which includes the shank portion 18. In this embodiment, the shank portion 18 is removably coupled to the inner part 180 and extends out the open end 107 of the adapter cavity 105. The shank portion 18 can include an outer shaft 186 shaped and adapted to connect with the inner shaft 184, thereby connecting the inner and outer parts of the male component 14 together.

In this embodiment, the inner and outer parts 180, 182 are connected together via an interference fit between the inner and outer shafts 184, 186, although other connection methods are possible, such as with the use of fasteners, via a keyjoint connection, via adhesive, etc. The inner part 180 is adapted to extend within the outer part 182 (i.e., the inner shaft 184 extends within the outer shaft 186). However, it is appreciated that other configurations are possible, such as having the outer part 182 extend within the inner part 180 in order to connect the two parts to one another. In the illustrated embodiment, the outer shaft 186 is further adapted to engage the nut 110 such that the outer shaft 186 is coupled between the inner shaft 184 and the nut projection 114, with the nut projection 114 being coupled between the outer shaft 186 and the housing 104. As such, it is noted that the inner and outer parts 180, 182 of the male component 14 are secured to the housing via their cooperation with each other and with the nut 110.

Still referring to FIG. 20, the shank portion 18 can include a cylindrical body 188 provided between the outer shaft 186 and the port 22. The cylindrical body 188 is configured to engage the nut 110 to further connect the outer part 182 (e.g., the shank portion 18) to the nut 110, and thus to the housing 104. The cylindrical body 188 generally has a greater diameter than the outer shaft 186 and the port 22. The nut 110 can thus have a complementary shape to the outer part 182 of the male component 14, for example, with the projection 114 of the nut 110 having an inner diameter adapted to receive the outer shaft 186, but prevent insertion of the cylindrical body 188 therein. The nut 110 illustratively includes an outer end 111 having a greater diameter than the projection 114 and adapted to receive therein the cylindrical body 188 of the shank portion 18.

In this embodiment, the outer end 111 defines a nut radial surface 113 adapted to face the cylindrical body 188. As will be described further below, the male component 14 is adapted to engage the nut 110 and cooperate therewith to define the axial play 95 between the flange portion 102 and the coupling adapter housing 104. Furthermore, the male component 14 engages the nut 110 in a manner such that the cylindrical body 188 is spaced from the nut radial surface 113, defining therebetween a second axial play 195. The axial play 95 and the second axial play 195 can generally have the same dimensions, although it is appreciated that one can be greater than the other, for example.

Figure 20A:
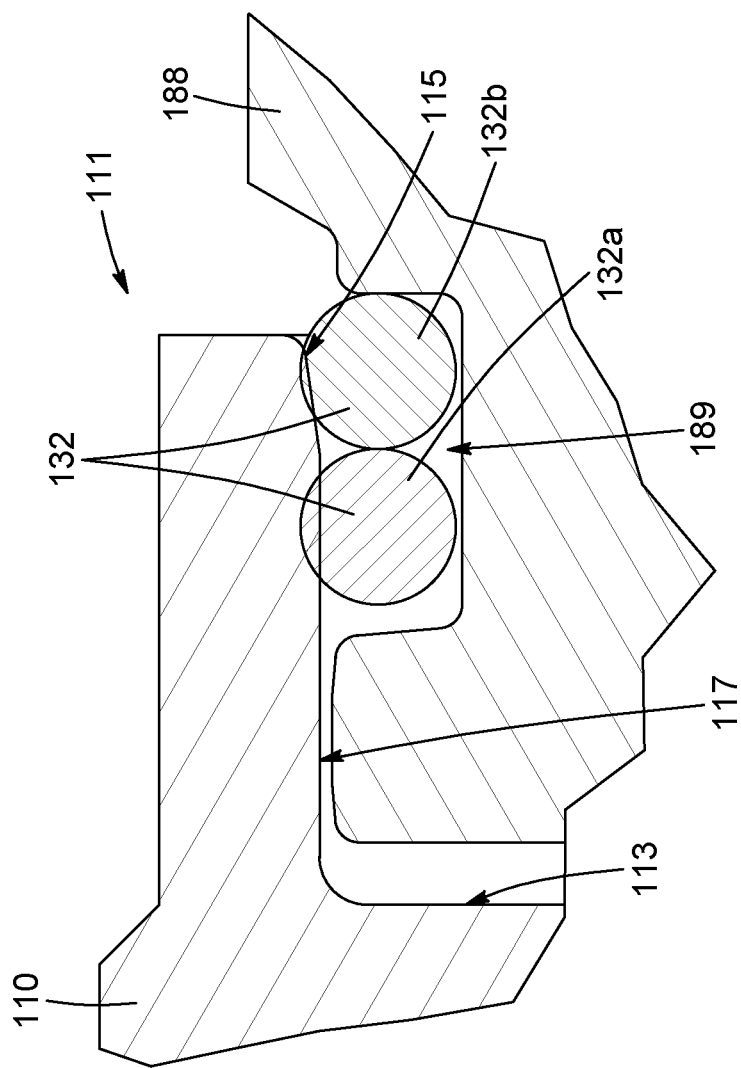
FIG. 20A is an enlarged view of a portion of the swivelling coupling shown in FIG. 20, showing a pair of sealing rings provided about the shank portion between the shank portion and the nut, according to an embodiment.

In some embodiments, the seal assembly includes various sealing elements, such as O-rings provided between the male component 14 and the nut 110, between the nut 110 and the housing 104, or a combination thereof. In this embodiment, and with reference to FIGS. 20 and 20A, the coupling 100 includes a plurality of sealing rings 132, including a pair of sealing rings 132 provided within the outer end 111 of the nut 110, between the nut 110 and the cylindrical body 188 of the shank portion 18. The sealing rings 132 are configured to seal interstices between the nut 110 and the male component 14 (e.g., the cylindrical body 188), and radially restrain the male component 14 within the nut 110. Referring more specifically to FIG. 20A, the sealing rings 132 include a first sealing ring 132a and a second sealing ring 132b provided in a circumferential pocket 189 defined about the cylindrical body 188. As mentioned, each sealing ring 132 extends between and engages the nut 110 (on an inner surface thereof) and the cylindrical body 188 (on an outer surface thereof), thereby radially restraining the cylindrical body 188 relative to the nut 110.

The first sealing ring 132a engages substantially flat surfaces, such that it radially restrains the male component 14 within the nut 110, along with defining a seal therebetween. In this embodiment, the outer end 111 of the nut can have a tapered inner edge 115, with the second sealing ring 132b engaging the tapered inner edge 115. As such, the second sealing ring 132b can be adapted to radially restrain the male component 14 (e.g., the outer part 182), and at least partially provide axial restraint to the male component as well. For example, and as described above, during operation, the coupling 100 can be subject to a suction effect which can pull the male component 14 further into the adapter cavity 105, thus pulling the cylindrical body 188 further into the outer end 111 of the nut 110. The tapered outer edge 115 can be shaped and configured to provide an abutment for the second sealing ring 132b, which can then block axial movement of the cylindrical body 188 toward the nut 110. In other words, the second sealing ring 132b is adapted to be squeezed between the lateral surface of the circumferential pocket 189 and the tapered inner edge 115, thereby preventing axial movement of the cylindrical body 188. It should be noted that, by blocking axial movement of the cylindrical body 188, the outer part 182 does not push against the inner part 180, thereby maintaining the flange portion 102 in contact with the slide-ring 120 within the adapter cavity 105.

In some embodiments, the second sealing ring 132b can be a pressure-energized seal, at least partially blocking both axial and radial movement of the male component, and enabling greater sealing efficiency as the pressure thereon increases.

It is appreciated that adjusting the angle at which the tapered inner edge 115 extends can correspondingly adjust the amount of axial restraint the second sealing ring 132b can provide. For example, a tapered edge of about 45 degrees can be adapted to prevent axial movement over a greater range of pressures than a tapered edge of about 10 degrees. In some embodiments, the tapered inner edge 115 of the nut 110 can be angled relative to a nut axial surface 117 by about 5 to about 85 degrees, although other configurations are possible. It should also be noted that greater forces applied on the second sealing ring 132b increase the sealing efficiency of the sealing ring 132b since the cylindrical body 188 presses and squeezes the sealing ring 132 between the outer end of the nut 111.

Figure 31:
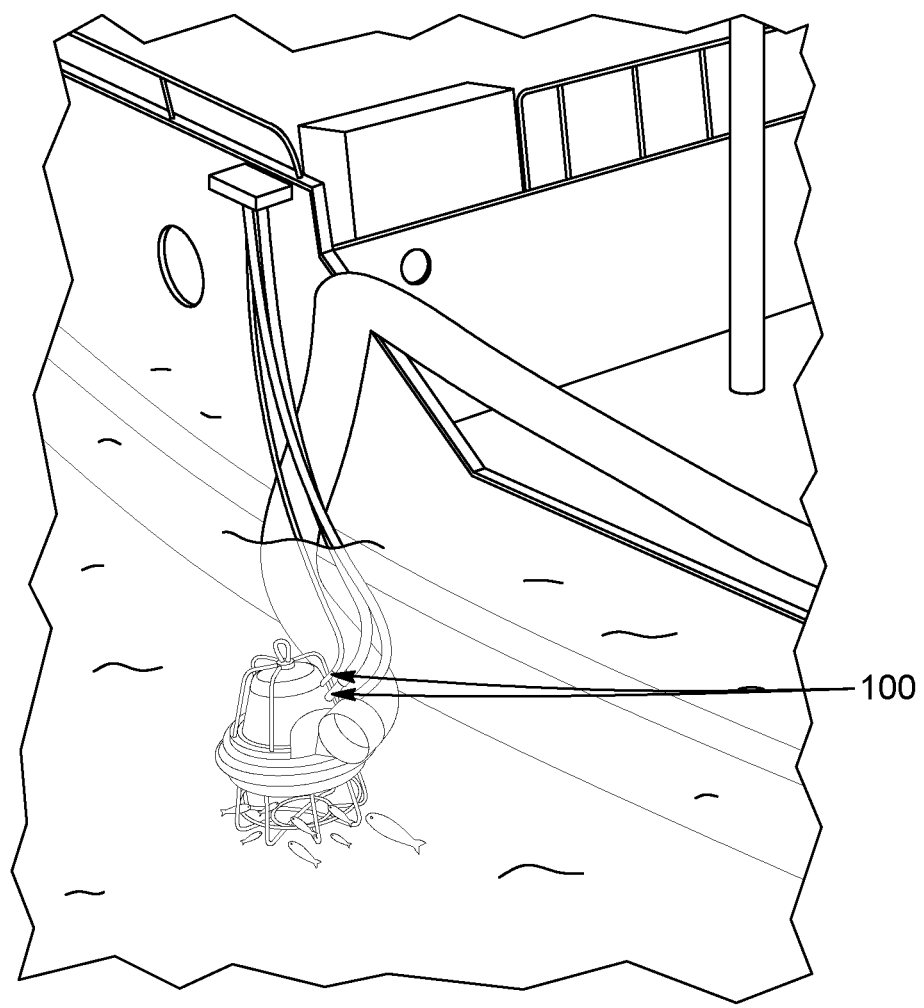
FIGS. 31 and 32 are representations of a possible application comprising one or more couplings, showing a fishing vessel pump prior to being submerged (FIG. 31) and the fishing vessel pump underwater for operation (FIG. 32).
Figure 32:
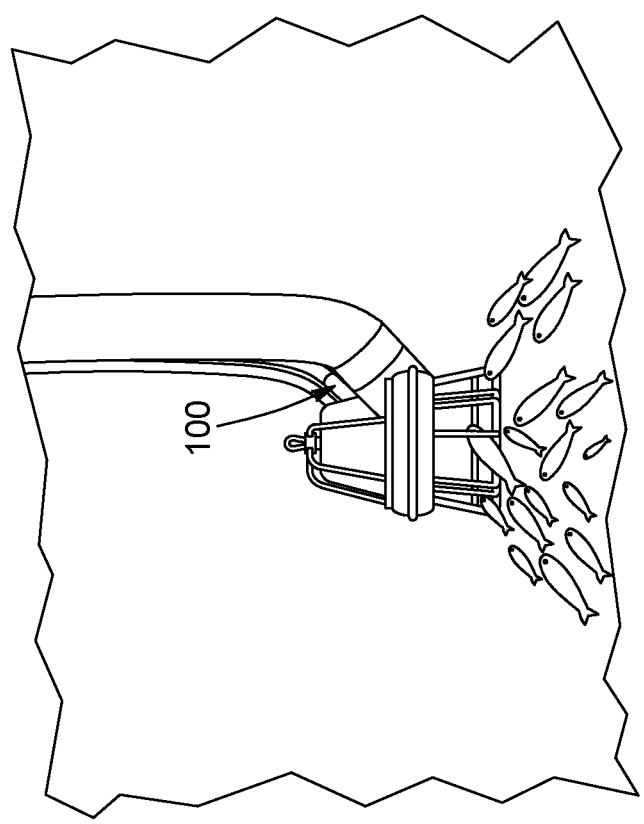

This can be desirable in certain situations, such as in vertical installations (seen in FIG. 33), or for underwater applications (seen in FIGS. 31 and 32), where the coupling is not required to be pressurized prior to being submerged since the increasing pressure from the water increases the sealing efficiency of the second sealing ring 132b. For example, and as seen in FIGS. 31 and 32, one or more couplings 100 can be connected to an underwater pump, such as a pump configured to collect fish as part of a commercial fishing vessel, prior to being submerged. The pump can then be submerged without pre-pressurizing the coupling to prevent water from infiltrating the coupling. As seen in FIG. 32, the pump can be lowered to about 20 m under the surface, prior to providing fluid through the coupling, and the sealing ring 132 (i.e., the second sealing ring 132b) is configured to prevent water and debris from entering the coupling 100. It should be understood that increasing the sealing efficiency of the coupling when underwater is desirable to prevent water from infiltrating the coupling and mixing with the hydraulic fluid, which can cause issues such as freezing the fluids within the coupling, for example. It should be noted that the coupling connected to the pump can be a swivelling coupling 100, or alternatively a non-swivelling coupling, with one or more swivelling couplings mounted along the pump conduits, such as at regular intervals (e.g., every 10 m).

Figure 22:
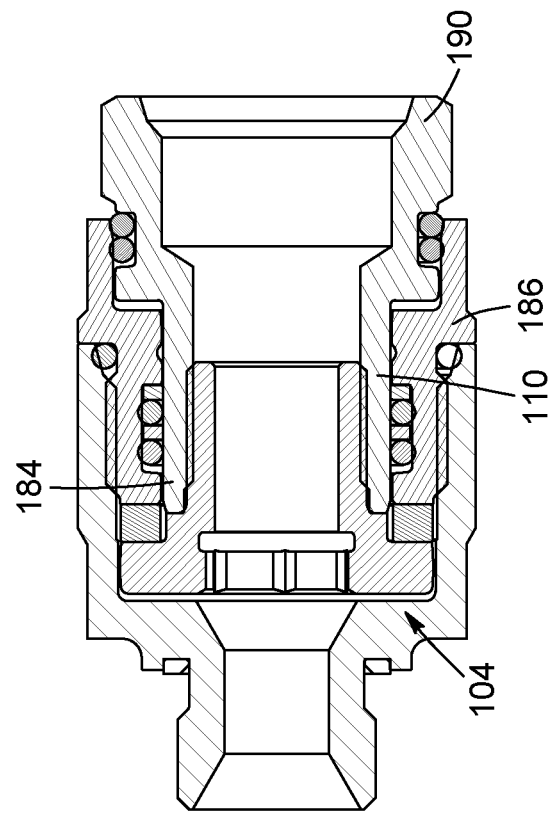
FIG. 22 is a sectional view of the swivelling coupling shown in FIG. 21, showing a shank portion defining a female connection, according to an embodiment.
Figure 21:
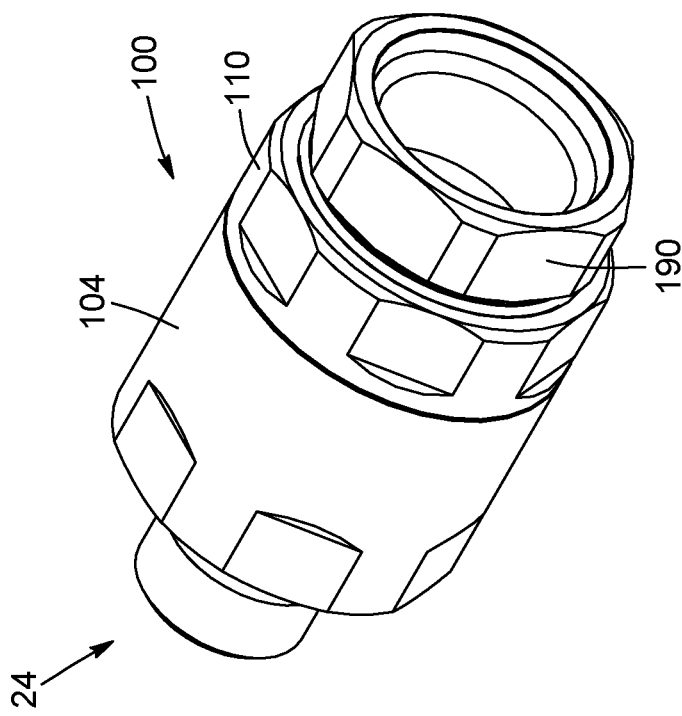
FIG. 21 is a perspective view of a swivelling coupling, according to an alternate embodiment.

In some embodiments, the outer part 182 of the male component 14 is removably connected to the inner part 180 and within the nut 110. As such, the outer part 182 can be disconnected from the inner part 180, thereby enabling interchangeability with another part. For example, the outer part 182 can be replaced with another male component outer part 182 (e.g., for maintenance or repair), or can be replaced with a corresponding female part. With reference to FIGS. 21 and 22, the coupling 100 can be adapted to define a female connection via the replacement of the outer part 182 of the male component, with a female component 190. The female component 190 connects to the inner part 180 in a similar fashion as the outer part 182 described above (e.g., with an outer shaft 186 coupled between the inner shaft 184 and the nut 110), and also engages the nut 110 via the first and second sealing rings 132a, 132b configured to at least partially block axial and radial movement of the female component relative to the nut 110 and housing 104.

Figure 13:
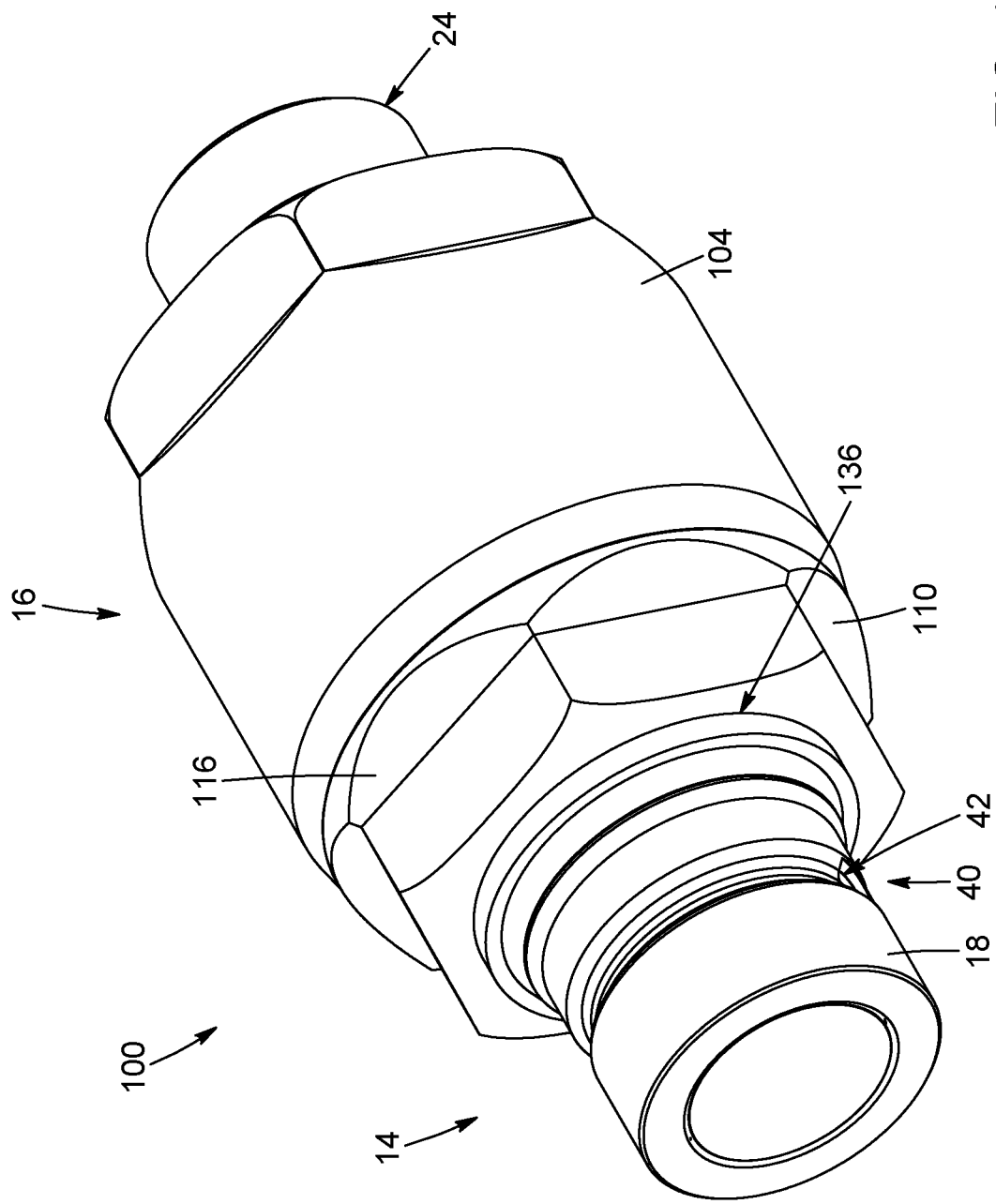
FIG. 13 is a perspective view of a swivelling coupling, according to an alternate embodiment.

It should be noted that the coupling can include any one of the above-described mechanisms adapted to prevent or block some form of movement of the components of the coupling. In some embodiments, the coupling can include both the restraining mechanism 40 and the outer seal 134 (e.g., the wiper ring 136, as seen in FIG. 13, or the tapered inner edge 115 and sealing rings 132, as seen in FIG. 20A), while in other embodiments, the coupling includes one of the restraining mechanism 40 and the outer seal 134, as seen in FIG. 1 (i.e., restraining mechanism 40 only), for example. It should also be noted that the coupling can be adapted to provide connection between a pair of fluid lines, as described herein, although other configurations are possible. For example, the coupling may also interconnect more than two fluid lines, where the male component 14 can include a plurality of ports 22 and can be connectable to a corresponding number of fluid lines. In some embodiments, the coupling can be coupled between an apparatus and a first hydraulic line, whereby the apparatus provides the flow of hydraulic fluid.

Figure 25:
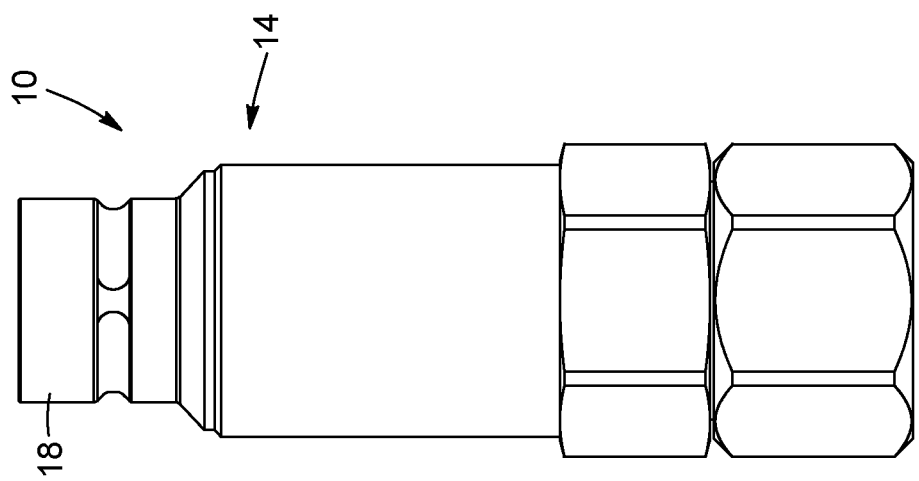
FIGS. 23 to 25 are top views of couplings, showing a coupling cartridge (FIG. 23), a swivelling coupling (FIG. 24) and a quick release male coupling (FIG. 25) according to possible embodiments.
Figure 24:
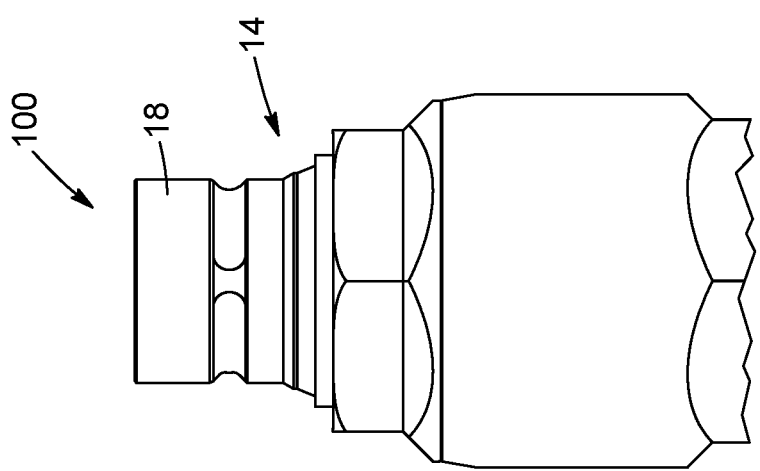
Figure 23:
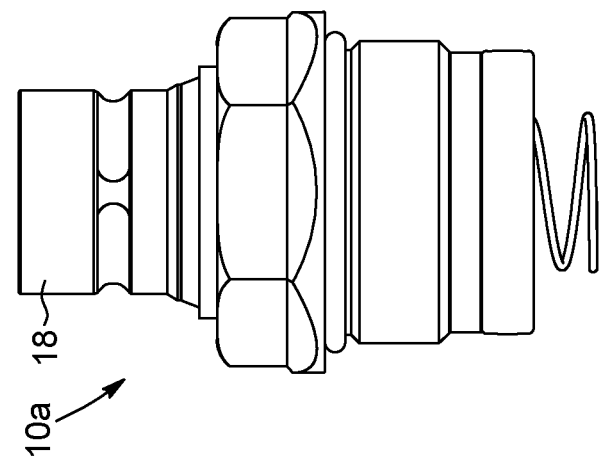
Figure 25B:
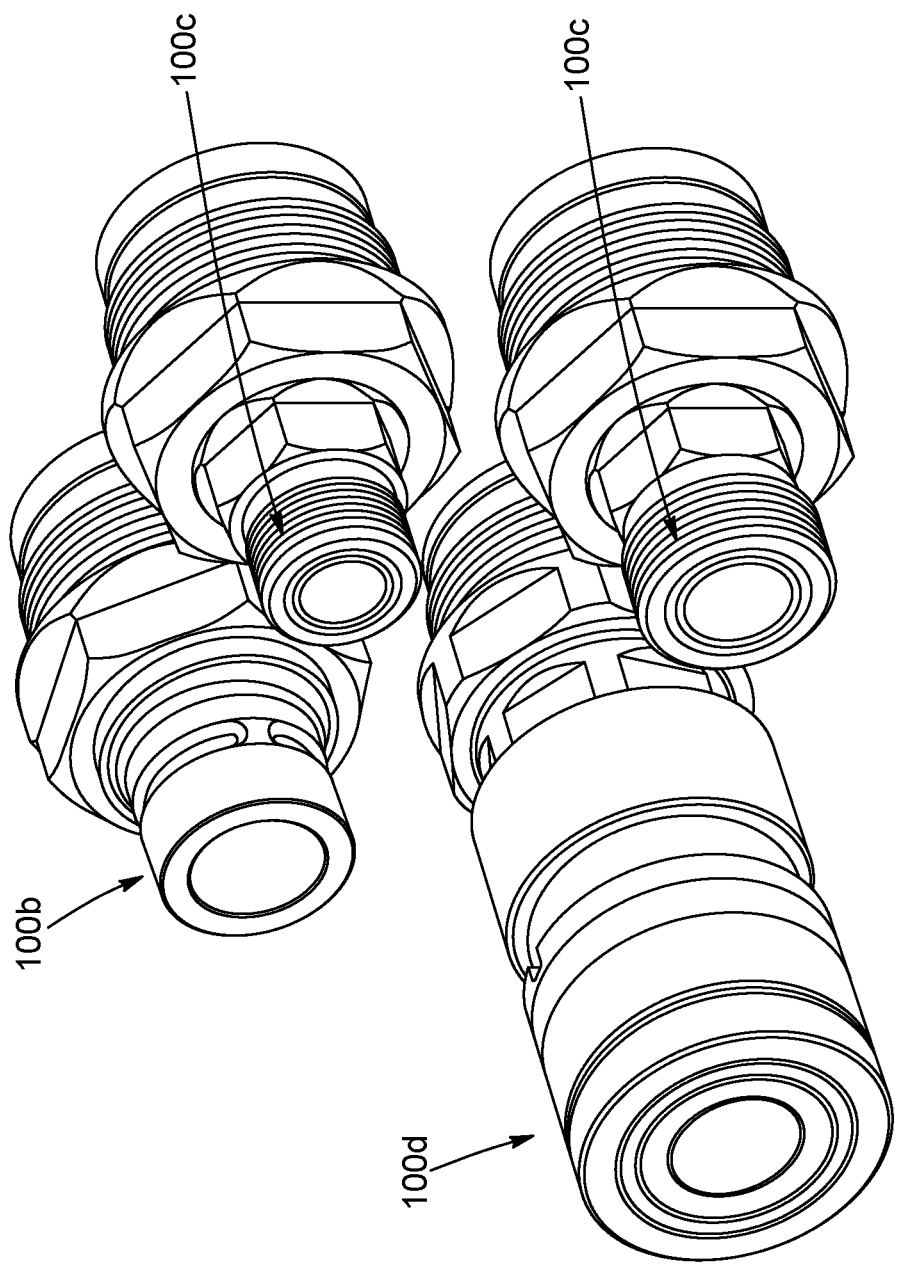
FIG. 25B is a perspective view of a multiport swivel assembly provided with various implementations of couplings, according to an embodiment.
Figure 25C:
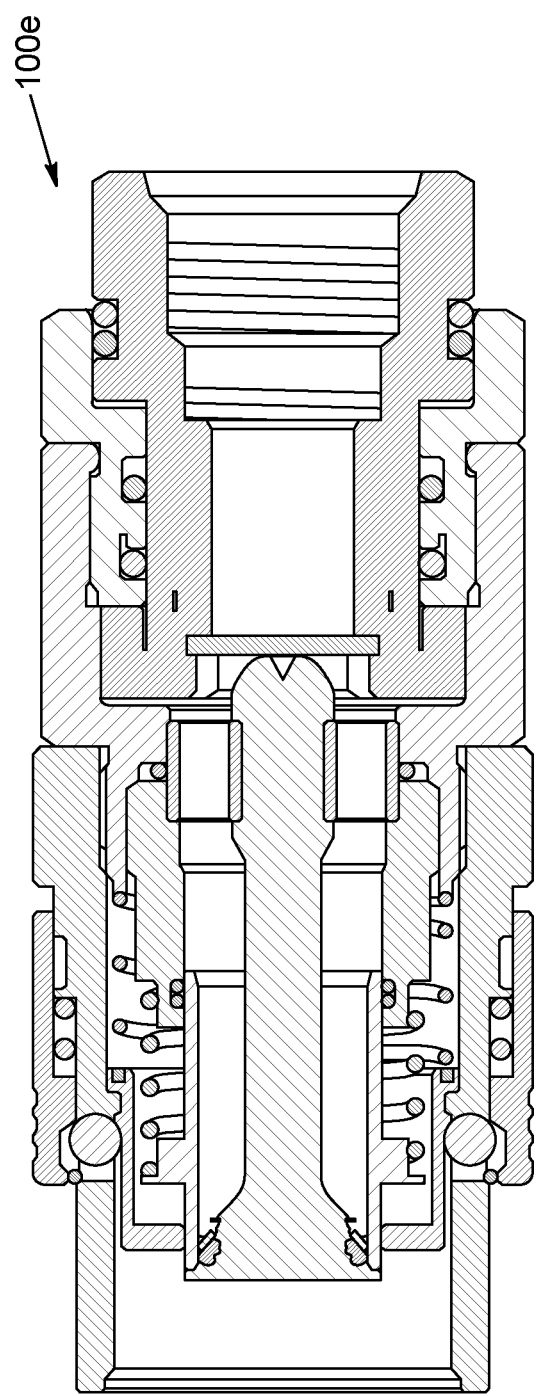
FIG. 25C is a sectional view of an alternative embodiment of a coupling, showing a threaded connection port.
Figure 27:
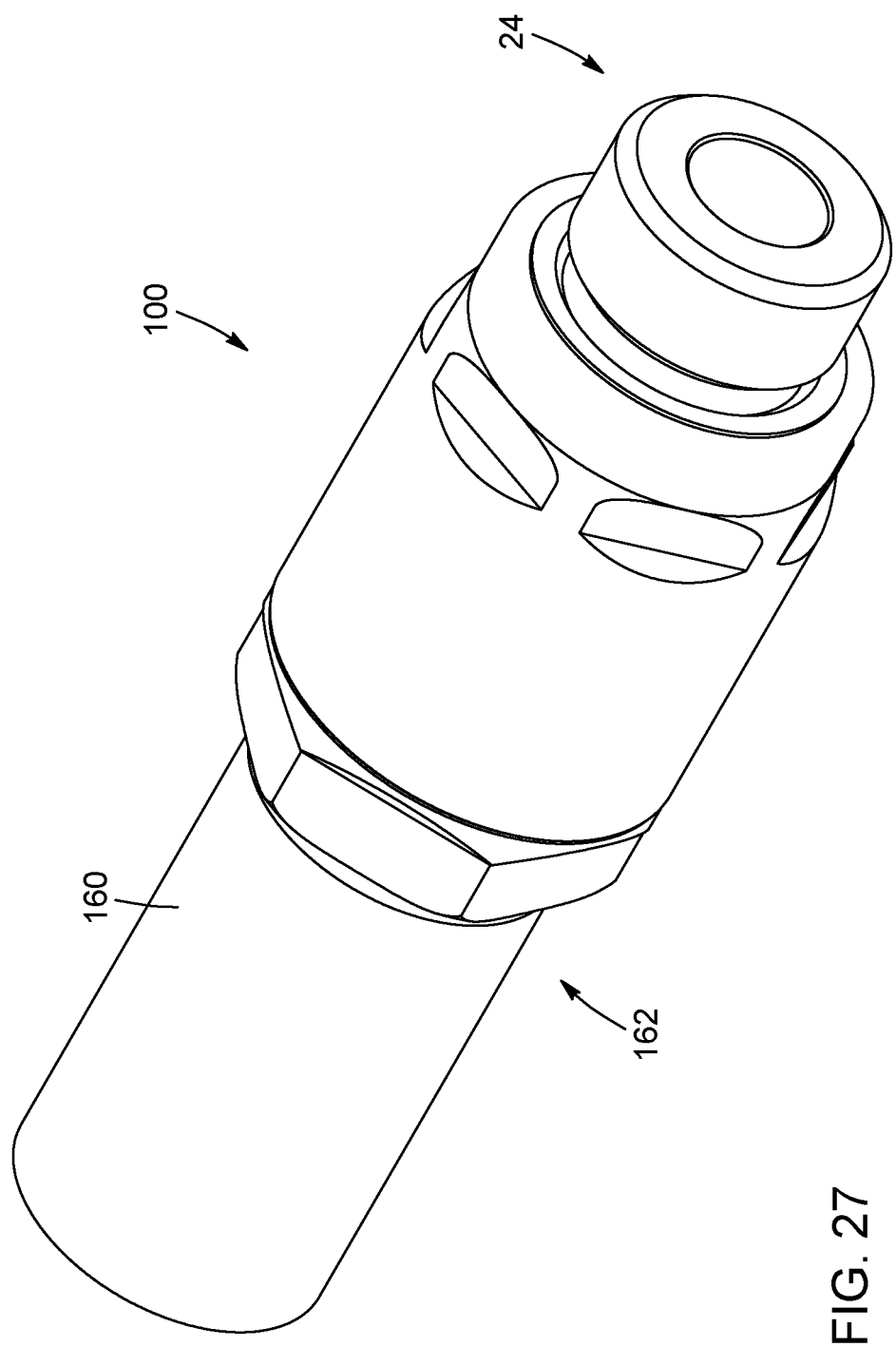
FIG. 27 is a perspective view of a coupling provided with a crimp fitting, according to an alternate embodiment.
Figure 30:
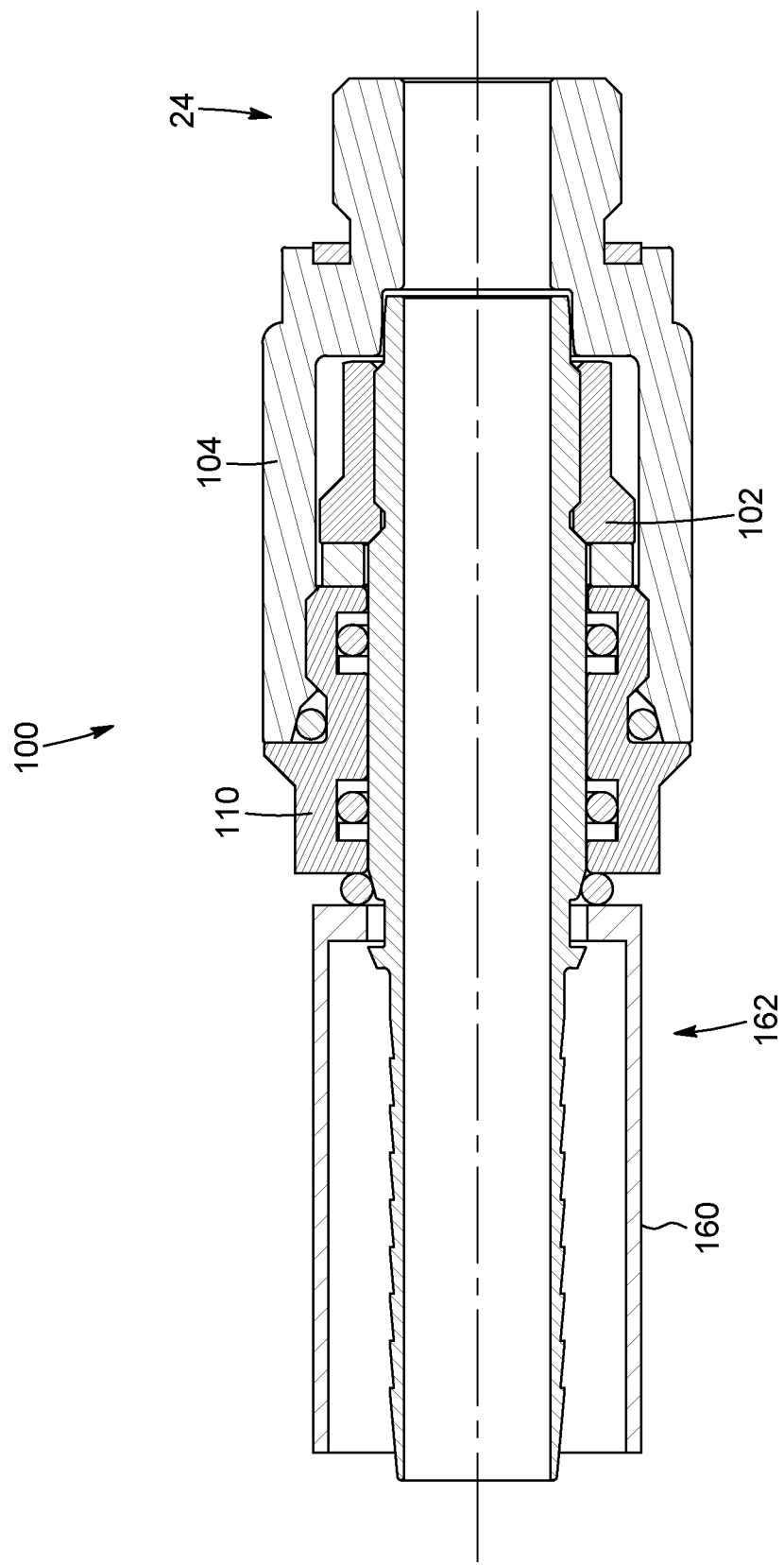
FIG. 30 is a sectional view of the quick lock release coupling shown in FIG. 29, taken along line 30-30, showing a fluid passage extending through a housing of the quick lock release coupling, according to an embodiment.

Referring to FIGS. 23 to 25C, the quick release male coupling and related components (e.g., the wiper ring 136 and/or the tapered inner edge 115 and sealing rings 132) and mechanisms (e.g., the restraining mechanism 40) described herein can be included in various types of couplings adapted for various applications. For example, the restraining mechanism 40 can be provided on a coupling cartridge 10a (FIG. 23) adapted for connection with a coupling housing, such as a swivelling coupling housing (FIG. 24) adapted for applications requiring manipulations of the hydraulic lines in a 3D space, such as in the forest industry. In other embodiments, the coupling can include a manifold-type coupling, which can be a quick release male coupling (FIG. 25). Alternatively, and with reference to FIGS. 25B and 25C, the coupling can correspond to a swivelling manifold-type coupling which can include quick-lock (or quick-release) capabilities 100b, threaded male connection(s) 100c, a female connection 100d and/or a «screw-to-connect coupling with swivel» 100e. However, it is appreciated that other configurations are possible, and that the couplings can have any suitable size and/or shape. In addition, and as seen in FIG. 26, the coupling can be part of a multiport assembly 150, whereby a plurality of couplings, such as swivelling couplings 100, can be coupled to a locking plate 152 which can be connected to hydraulic machinery in any suitable manner.

Now referring to FIGS. 27 to 30, the coupling 10 can be provided with a crimp fitting 160 attachable to one end of the coupling 10, such as to the male component 14. It should be noted that the crimp fitting, or crimped sleeve 160, is adapted to create custom hydraulic hose assemblies, and defines a crimped end 162 of the coupling 10 (i.e., the end provided with the crimp fitting 160) adapted to be connected to a hydraulic line (e.g., the first fluid line). The crimped end 162 is securable to the hydraulic line via a crimping machine or device, creating a permanent connection therebetween for repairing or creating hydraulic line assemblies. In this embodiment, the coupling can include a plurality of sealing rings 132, including an intermediary sealing ring 132c (e.g., an O-ring) between the crimped sleeve and the projection 114 of the nut 110 configured to block axial movement of the crimped sleeve 160 relative to the nut 110 and housing 104, thereby blocking axial movement of the male component 14 in a similar fashion.

It is appreciated that in the implementations described herein, the couplings can have increased sealing efficiency against external pressures, such as in underwater applications, for example. Moreover, the sealing efficiency of these couplings can increase as the surrounding pressure increases as the seals surrounding the coupling are squeezed into position, further sealing the interstices in the coupling. In some embodiments, the sealing elements can provide axial and radial contact with one or more component of the coupling. These sealing elements can be adapted to at least partially block radial and axial movement of the one or more components, thereby reducing the stress applied thereon and increasing their lifespan.

The present disclosure may be embodied in other specific forms. The described example implementations are to be considered in all respects as being only illustrative and not restrictive. For example, it should be understood that the shape of the male component 14 may be modified in a plurality of ways. Similarly, the internal shape of the adapter cavity 105 can be modified and should have a corresponding shape to house the flange portion 102, and to provide support surfaces for distributing forces while allowing adequate play for lubrication and movement. Furthermore, the flange portion 102 may have surfaces that are bevelled or curved. These bevelled or curved surfaces can affect the fluid movement between the surfaces of the coupling and also affect the force distribution. Since the pressurized fluid exerts pressure perpendicularly with respect to the solid surfaces of the coupling components, it is appreciated that varying the angles and curvatures and/or surface area of the male component, different force-distribution effects may be achieved.

Figure 35:
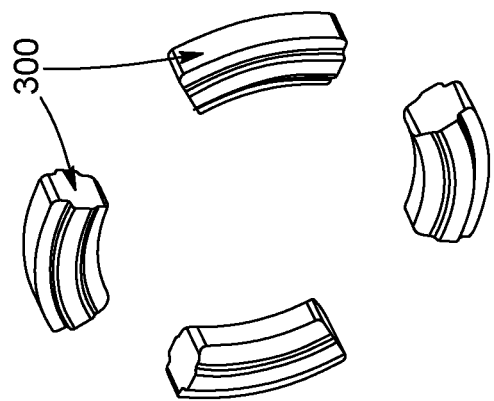
FIGS. 34 and 35 are perspective views of an alternate embodiment of a coupling, showing latching elements (FIG. 35) having an elongate shape and extending partially circumferentially within ports of a male component (FIG. 34).
Figure 34:
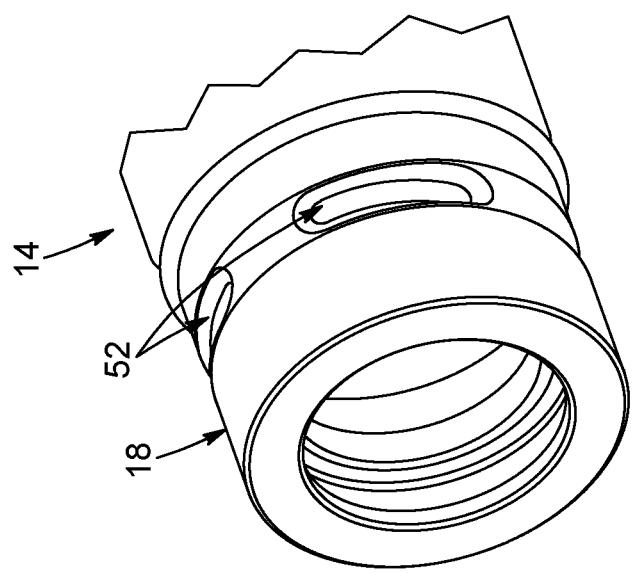

In addition, one or more of the components of the coupling(s) and/or steps of the method(s) described herein could be modified, simplified, altered, omitted and/or interchanged, without departing from the scope of the present disclosure, depending on the particular applications which the coupling is intended for, and/or the desired end results, as briefly exemplified herein and as also apparent to a person skilled in the art. For example, the restraining mechanism 40 can be modified to enable interaction and cooperation with a different component than a ball bearing assembly. As seen in FIGS. 34 and 35, in some embodiments, the internal components of the female portion can include one or more latching elements 300 having an elongate shape, and which can extend at least partially circumferentially within the port of the female portion, for example. As such, the male component can include complementarily-shaped detents (e.g., recesses 52) for receiving therein the latching elements 300. It is noted that the latching elements 300 can be provided at regular intervals about the male component 14 (e.g, about the shank portion 18), such as at 90 degrees intervals, although other configurations are possible.

The present disclosure intends to cover and embrace all suitable changes in technology. The scope of the present disclosure is, therefore, described by the appended claims rather than by the foregoing description. The scope of the claims should not be limited by the implementations set forth in the examples, but should be given the broadest interpretation consistent with the description as a whole.

As used herein, the terms "coupled", "coupling", "attached", "connected" or variants thereof as used herein can have several different meanings depending in the context in which these terms are used. For example, the terms coupled, coupling, connected or attached can have a mechanical connotation. For example, as used herein, the terms coupled, coupling or attached can indicate that two elements or devices are directly connected to one another or connected to one another through one or more intermediate elements or devices via a mechanical element depending on the particular context.

In the above description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The implementations, geometrical configurations, materials mentioned and/or dimensions shown in the figures are optional, and are given for exemplification purposes only.

In addition, although the optional configurations as illustrated in the accompanying drawings comprises various components and although the optional configurations of the couplings as shown may consist of certain geometrical configurations as explained and illustrated herein, not all of these components and geometries are essential and thus should not be taken in their restrictive sense, i.e. should not be taken as to limit the scope of the present disclosure. It is to be understood that other suitable components and cooperations thereinbetween, as well as other suitable geometrical configurations may be used for the implementation and use of the couplings, and corresponding parts, as briefly explained and as can be easily inferred herefrom, without departing from the scope of the disclosure.

The invention claimed is:

1. A hydraulic coupling for providing a connection between a pair of hydraulic lines, comprising:
   a coupling adapter having a fluid channel therethrough and comprising:
      a housing defining an internal cavity having internal surfaces comprising at least one radial surface and at least one axial surface, the internal cavity having an open end; and
      an adapter port adapted to engage one of the pair of hydraulic lines and establish fluid communication between the one of the pair of hydraulic lines and the fluid channel;
   a male component having a fluid passage therethrough and comprising:
      a shank portion having a shank portion port adapted to engage the other one of the pair of hydraulic lines and establish fluid communication between the other one of the pair of hydraulic lines and the fluid passage;
      a flange portion extending radially outward from the shank portion, the male component being insertable within the internal cavity of the housing to enable the flange portion to cooperatively abut on the at least one radial surface, and to enable the fluid passage and the fluid channel to be in fluid communication;
   a nut securable within the internal cavity of the housing and surrounding the shank portion to radially restrain the shank portion within the internal cavity, the nut having a projection extending into the internal cavity for axially restraining the flange portion within the internal cavity, the nut further comprising an inner surface adapted to contact the shank portion and an outer end extending along the shank portion opposite the projection and outside the internal cavity, the outer end comprising an end surface extending transversely relative to the inner surface, the male component being adapted to rotate with respect to the housing and the nut about a longitudinal axis of the shank portion, thereby enabling the pair of hydraulic lines to be swivellably interconnected; and
   a sealing assembly comprising:
      an inner seal provided between the inner surface of the nut and the shank portion to substantially seal inner interstices therebetween; and
      an outer seal provided about the shank portion adapted to engage a junction between the end surface of the nut and the shank portion to substantially seal outer interstices therebetween, the outer seal being made of resilient material and adapted to at least partially block axial movement and radial movement of the male component relative to the housing.

2. The hydraulic coupling according to claim 1, wherein the flange portion is positioned within the internal cavity in a manner defining an axial play with the at least one radial surface.

3. The hydraulic coupling according to claim 1, wherein the shank portion comprises an outer groove extending circumferentially around an outer surface of the shank portion, and wherein the outer seal is adapted to have a portion thereof engage the outer groove.

4. The hydraulic coupling according to claim 3, wherein the outer groove comprises a groove wall extending radially outwardly relative to the longitudinal axis of the shank portion, and wherein the outer seal is adapted to extend between the nut and the groove wall.

5. The hydraulic coupling according to claim 4, wherein the nut comprises a tapered inner edge such that a thickness of the nut decreases toward an end of the nut, and wherein the outer seal is adapted to extend between the tapered inner edge and the groove wall.

6. The hydraulic coupling according to claim 5, wherein the tapered inner edge defines an angle of about 5 to about 85 degrees relative to the longitudinal axis of the shank portion.

7. The hydraulic coupling according to claim 5, wherein the outer seal comprises a first outer seal provided within the outer groove and extending between the nut and the shank portion to at least partially block the radial movement of the shank portion, and comprises a second outer seal provided within the outer groove and extending between the tapered inner edge and the groove wall to at least partially block the radial movement and the axial movement of the shank portion.

8. The hydraulic coupling according to claim 1, further comprising a slide-ring provided about the shank portion between the flange portion and the projection of the nut, the slide-ring being adapted to reduce wear of the flange portion and the nut.

9. The hydraulic coupling of claim 8, wherein the slide-ring is in sealing engagement with the projection of the nut on a first side thereof, and in sealing engagement with the flange portion of a second side thereof, and wherein the outer seal is configured to maintain the slide-ring in sealing engagement with the projection and with the flange portion by at least partially blocking the axial movement of the male component.

10. The hydraulic coupling according to claim 1, wherein the hydraulic coupling is a quick-release hydraulic coupling.

11. The hydraulic coupling according to claim 1, wherein the open end of the internal cavity has a perimeter rim and the nut comprises a lip abuttable over said perimeter rim.

12. The hydraulic coupling according to claim 1, wherein the shank portion is extendable through the nut so that the shank portion port is located beyond the nut.

13. The hydraulic coupling according to claim 1, wherein the shank portion is removably connected to the flange portion.

14. A method of connecting a first fluid line provided with a female component to a second fluid line, comprising:
  connecting a first end of a hydraulic coupling to the second fluid line; and
  connecting a second end of the hydraulic coupling to the first fluid line, the second end being provided with a male component configured to engage the female component, the hydraulic coupling being provided with a sealing ring provided about the male component and being shaped and adapted to at least partially block axial and radial movement of the male component relative to a housing of the coupling, wherein the hydraulic coupling is as defined as the hydraulic coupling in claim 1.

15. The method of claim 14, wherein the hydraulic coupling is a quick-release coupling.

16. The method of claim 14, wherein the hydraulic coupling is adapted to operate between about 0 psi and 5000 psi.

17. A hydraulic coupling for providing a connection between a pair of hydraulic lines, comprising:
  a coupling adapter having a fluid channel therethrough and comprising:
    a housing defining an internal cavity having internal surfaces comprising at least one radial surface and at least one axial surface, the internal cavity having an open end; and
    an adapter port adapted to engage one of the pair of hydraulic lines and establish fluid communication between the one of the pair of hydraulic lines and the fluid channel;
  a male component having a fluid passage therethrough and comprising:
    a shank portion having a shank portion port adapted to engage the other one of the pair of hydraulic lines and establish fluid communication between the other one of the pair of hydraulic lines and the fluid passage;
    a flange portion extending radially outward from the shank portion, the male component being insertable within the internal cavity of the housing to enable the flange portion to cooperatively abut on the at least one radial surface, and to enable the fluid passage and the fluid channel to be in fluid communication, wherein the shank portion is removably connected to the flange portion;
  a nut securable within the internal cavity of the housing and surrounding the shank portion to radially restrain the shank portion within the internal cavity, the nut having a projection extending axially and into the internal cavity for axially restraining the flange portion within the internal cavity, the nut being adapted to allow the male component to rotate with respect to the housing and the nut about a longitudinal axis of the shank portion, thereby enabling the pair of hydraulic lines to be swivellably interconnected; and
  a sealing assembly comprising:
    an outer seal provided about the shank portion adapted to engage a junction between the nut and the shank portion to substantially seal interstices therebetween, the outer seal being made of resilient material and adapted to at least partially block axial movement and radial movement of the male component relative to the housing.

\* \* \* \* \*